(12) United States Patent
Taira et al.

(10) Patent No.: US 11,415,756 B2
(45) Date of Patent: Aug. 16, 2022

(54) DUPLEX OPTICAL CONNECTOR PLUG

(71) Applicant: SEIKOH GIKEN CO., LTD., Chiba (JP)

(72) Inventors: Junji Taira, Chiba (JP); Yohei Takaishi, Chiba (JP); Masayuki Jibiki, Chiba (JP); Naotoshi Shiokawa, Chiba (JP)

(73) Assignee: SEIKOH GIKEN CO., LTD., Matsudo (JP)

( * ) Notice: Subject to any disclaimer, the term of this patent is extended or adjusted under 35 U.S.C. 154(b) by 52 days.

(21) Appl. No.: 17/102,720

(22) Filed: Nov. 24, 2020

(65) Prior Publication Data

US 2021/0286134 A1 Sep. 16, 2021

(30) Foreign Application Priority Data

Mar. 11, 2020 (JP) .............................. JP2020-042451

(51) Int. Cl.
*G02B 6/00* (2006.01)
*G02B 6/38* (2006.01)
*H01R 13/627* (2006.01)

(52) U.S. Cl.
CPC ......... *G02B 6/3825* (2013.01); *G02B 6/3831* (2013.01); *G02B 6/3874* (2013.01);
(Continued)

(58) Field of Classification Search
CPC .. G02B 6/3825; G02B 6/3831; G02B 6/3874; G02B 6/3887; G02B 6/3893;
(Continued)

(56) References Cited

U.S. PATENT DOCUMENTS 10,288,819 B2   5/2019 Chang et al.
2016/0116685 A1* 4/2016 Wong ................. H01R 13/6335
                                                            385/56
(Continued)

FOREIGN PATENT DOCUMENTS

JP   2018-010274 A   1/2018
WO   2018/218153 A1  11/2018

OTHER PUBLICATIONS

Extended European Search Report of corresponding European Application No. 21154576.9 dated Jun. 23, 2021, 11 pages.

*Primary Examiner* — Jennifer Doan
(74) *Attorney, Agent, or Firm* — United IP Counselors, LLC

(57) ABSTRACT

A duplex optical connector plug includes: a first engagement latch being elastically deformable and including a first abutting projection configured to abut on a front end of a first top wall and a first engagement part formed on an axial rear side of the first abutting projection and configured to engage with an optical connector adaptor when the first optical connector assembly is inserted into the optical connector adaptor; and a second engagement latch being elastically deformable and including a second abutting projection configured to abut on a front end of a second top wall and a second engagement part formed on an axial rear side of the second abutting projection and configured to engage with the optical connector adaptor when the second optical connector assembly is inserted into the optical connector adaptor.

18 Claims, 16 Drawing Sheets

(52) U.S. Cl.
CPC ......... *G02B 6/3887* (2013.01); *G02B 6/3893* (2013.01); *G02B 6/3897* (2013.01); *H01R 13/627* (2013.01)

(58) Field of Classification Search
CPC .. G02B 6/3897; G02B 6/3821; G02B 6/3879; G02B 6/3891; G02B 6/3869; G02B 6/00; H01R 13/627
See application file for complete search history.

(56) References Cited

U.S. PATENT DOCUMENTS

| | | |
|---|---|---|
| 2018/0088283 A1 | 3/2018 | Taira et al. |
| 2018/0088288 A1 | 3/2018 | Taira et al. |
| 2018/0217340 A1 | 8/2018 | Wong et al. |
| 2018/0284362 A1 | 10/2018 | Kadar-Kallen et al. |
| 2019/0033531 A1 | 1/2019 | Taira et al. |
| 2019/0154922 A1 | 5/2019 | Elenbaas et al. |
| 2019/0346633 A1 | 11/2019 | Cloud et al. |
| 2019/0391343 A1 | 12/2019 | Aoshima et al. |
| 2020/0301079 A1* | 9/2020 | Leigh .................. G02B 6/3851 |

* cited by examiner

DUPLEX OPTICAL CONNECTOR PLUG

CROSS-REFERENCE TO RELATED APPLICATIONS

This application claims the benefit of priority to Japanese Patent Application No. 2020-042451, filed on Mar. 11, 2020, the entire contents of which are hereby incorporated by reference.

BACKGROUND

1. Technical Field

The present invention relates to a duplex optical connector plug.

2. Description of the Background

Japanese Patent Unexamined Patent Application Publication No. 2018-10274 (hereinafter referred to as "Patent Literature 1") discloses a conventional duplex optical connector plug including: a first optical connector assembly; a second optical connector assembly; an inner housing; and an outer housing. The first optical connector assembly includes: a rust plug frame configured to house a rust ferrule that retains a first optical fiber and axially extends; a first stop ring inserted into the first plug frame; and a first spring disposed between the first ferrule and the first stop ring to bias the first ferrule axially frontward. The second optical connector assembly includes: a second plug frame configured to house a second ferrule that retains a second optical fiber and axially extends; a second stop ring inserted into the second plug frame; and a second spring disposed between the second ferrule and the second stop ring to bias the second ferrule axially frontward. The second optical connector assembly is provided in parallel with the first optical connector assembly. The inner housing houses the rear end of the first stop ring and the rear end of the second stop ring. The outer housing houses the inner housing.

The conventional duplex optical connector plug includes: a first gear formed on the rear end of the first stop ring; a second gear formed on the rear end of the second stop ring; and an intermediate gear interposed between the first gear and the second gear to transmit a rotational force of one gear out of the first and second gears to the other gear and rotate the other gear in a direction identical to the one gear. When one optical connector assembly out of the first and second optical connector assemblies rotates about its axis, in association therewith, the other optical connector assembly rotates about its axis in a direction identical to the one optical connector assembly.

The optical connector plug includes a first engagement latch extending axially frontward from one lateral side of a top wall of the outer housing and a second engagement latch extending axially frontward from other lateral side of the top wall of the outer housing. A first engagement part is formed at a front end of the first engagement latch, and a second engagement part is formed at a front end of the second engagement latch. In the duplex optical connector plug, when the first and second optical connector assemblies are inserted into an optical connector adaptor, the first and second engagement parts engage with the optical connector adaptor and the optical connector plug is coupled to the optical connector adaptor to establish an optical connection.

BRIEF SUMMARY

In the duplex optical connector plug disclosed in Patent Literature 1, the front end of the first engagement latch is spaced apart upward from the front end of the top wall of the first plug frame, and the front end of the second engagement latch is spaced apart upward from the front end of the top wall of the second plug frame. By the front ends of the first and second engagement latches elastically deforming downward toward the top walls of the first and second plug frames, the engagement between the first and second engagement parts and the optical connector adaptor is cancelled and the coupling between the optical connector plug and the optical connector adaptor is cancelled.

In the optical connector plug, the front ends of the first and second engagement latches are spaced apart upward from the front ends of the top walls of the first and second plug frames. Accordingly, the resilience of the first and second engagement latches is weak. When a boot fixed by a crimping ring or an optical fiber cord extending axially rearward from the boot is pulled and consequently the optical connector plug is pulled in the direction of cancelling the coupling with the optical connector adaptor and an axial tensile load acts on the first and second engagement latches, the first and second engagement latches may elastically deform downward. This may accidentally decouple the optical connector plug from the optical connector adaptor and lose communication. Furthermore, when the first and second optical connector assemblies of the optical connector plug are inserted into the optical connector adaptor, the first and second engagement latches elastically deformed downward may not easily recover the upper original position. That is, the first and second engagement latches may fail to surely engage with the optical connector adaptor.

An object of the present invention is to provide a duplex optical connector plug which withstands a pulling force acting on the optical connector plug optically connected to an optical connector adaptor in the direction of decoupling the optical connector plug from the optical connector adaptor, thereby avoiding a communication loss caused by accidental decoupling from the optical connector adaptor.

A duplex optical connector plug including:
 a first optical connector assembly including
   a first plug frame configured to house a first ferrule that axially extends and retains a first optical fiber, the first plug frame including a first top wall.
   a first stop ring configured to be inserted into the first plug frame, and
   a first spring disposed between the first ferrule and the first stop ring to bias the first ferrule axially frontward;
 a second optical connector assembly provided in parallel with the first optical connector assembly; the second optical connector assembly including
   a second plug frame configured to house a second ferrule that axially extends and retains a second optical fiber, the second plug frame including a second top wall,
   a second stop ring configured to be inserted into the second plug frame, and
   a second spring disposed between the second ferrule and the second stop ring to bias the second ferrule axially frontward;
 an inner housing configured to house a rear end of the first stop ring and a rear end of the second stop ring; and
 an outer housing configured to house the inner housing;
 the outer housing including
   a front end opening opening at a front end of the outer housing,
   a third top wall, and
   a first engagement latch being elastically deformable and axially extending on a first lateral side of the third top wall and extending axially frontward from the front end opening, the first engagement latch including
  a first abutting projection formed at a front end of the first engagement latch and configured to abut on a front end positioned on an axially front side of the first top wall, and
  a first engagement part formed on an axial rear side of the first abutting projection and configured to engage with an optical connector adaptor when the first optical connector assembly is inserted into the optical connector adaptor, and
a second engagement latch being elastically deformable and axially extending on a second lateral side of the third top wall and extending axially frontward from the front end opening, the second engagement latch including
  a second abutting projection formed at a front end of the second engagement latch and configured to abut on a front end positioned on an axially front side of the second top wall, and
  a second engagement part formed on an axial rear side of the second abutting projection and configured to engage with the optical connector adaptor when the second optical connector assembly is inserted into the optical connector adaptor.

The duplex optical connector plug withstands a pulling force acting on the optical connector plug optically connected to an optical connector adaptor in the direction of decoupling the optical connector plug from the optical connector adaptor, thereby avoiding a communication loss caused by accidental decoupling from the optical connector adaptor.

DETAILED DESCRIPTION

Figure 1:
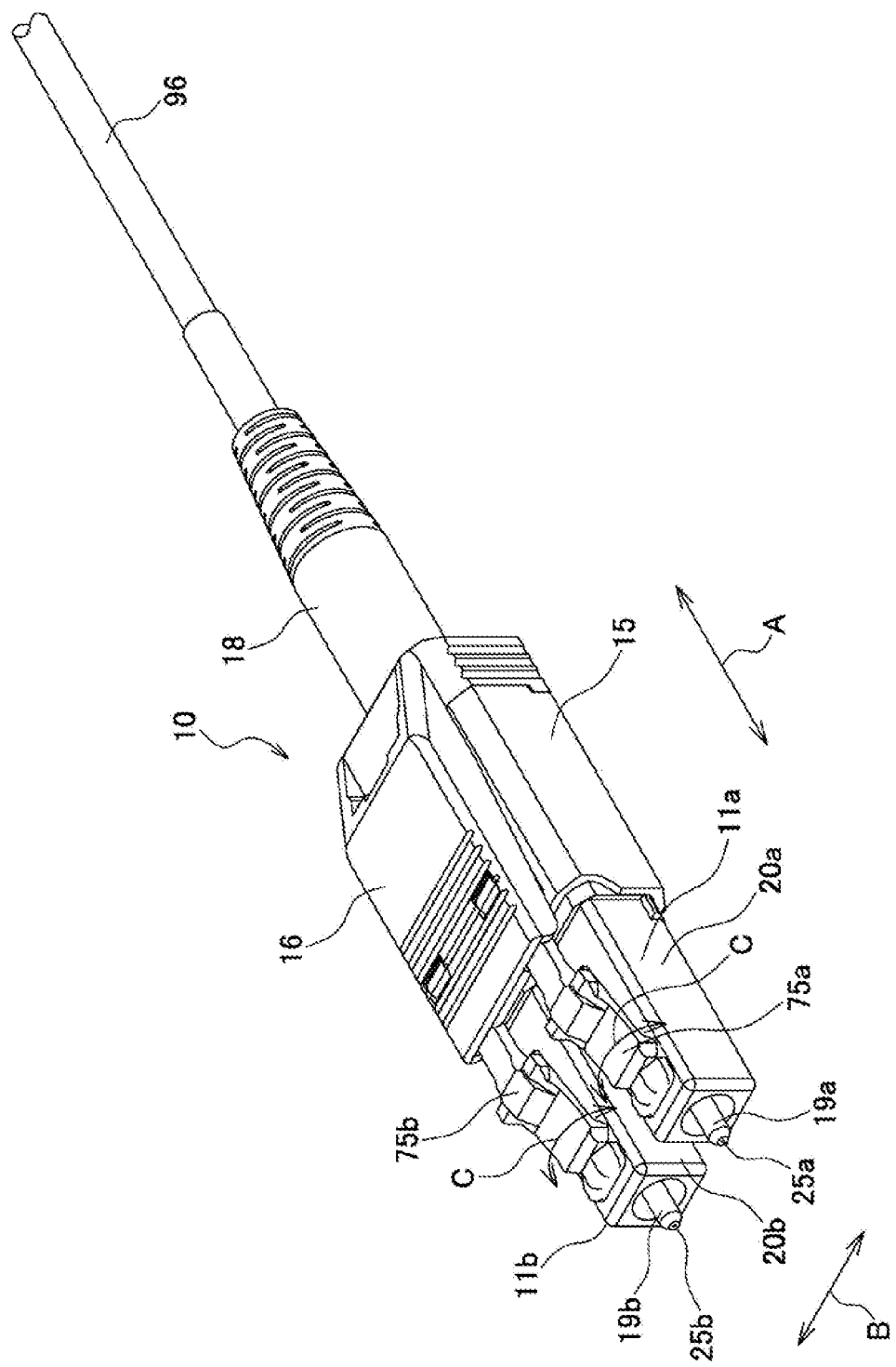
FIG. 1 is a perspective view of a duplex optical connector plug according to an embodiment.
Figure 2:
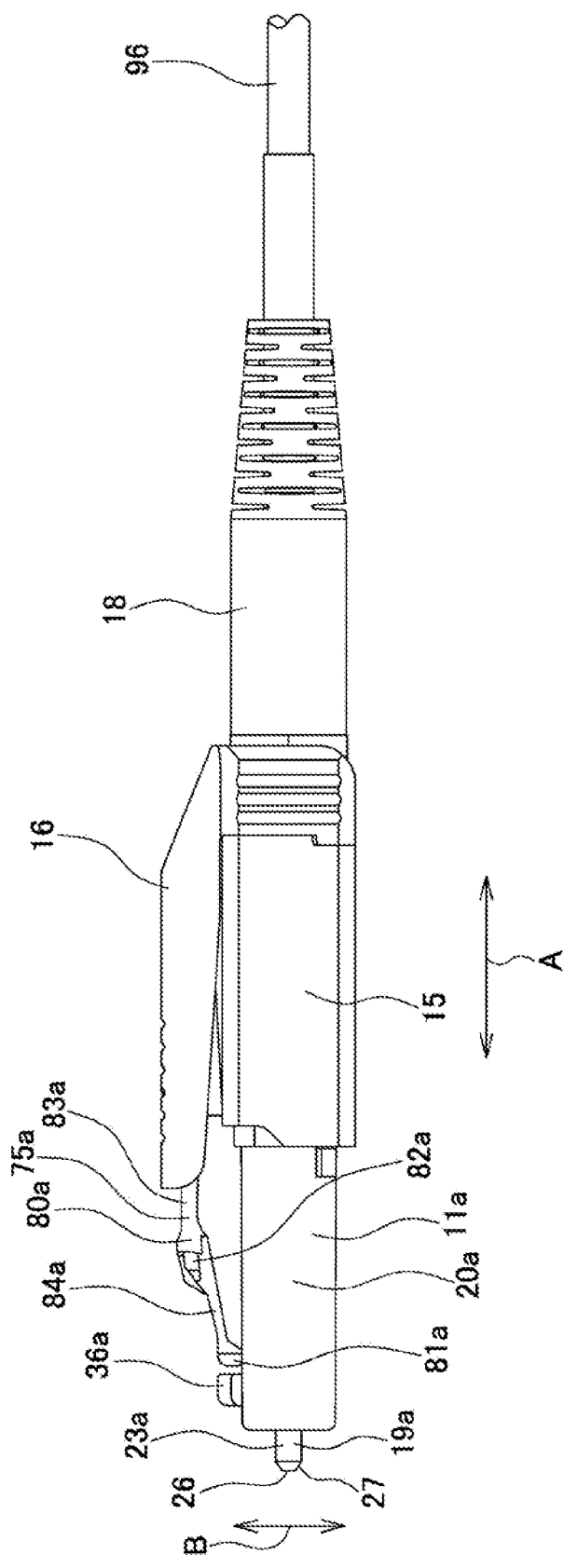
FIG. 2 is a side view of a duplex optical connector plug.
Figure 3:
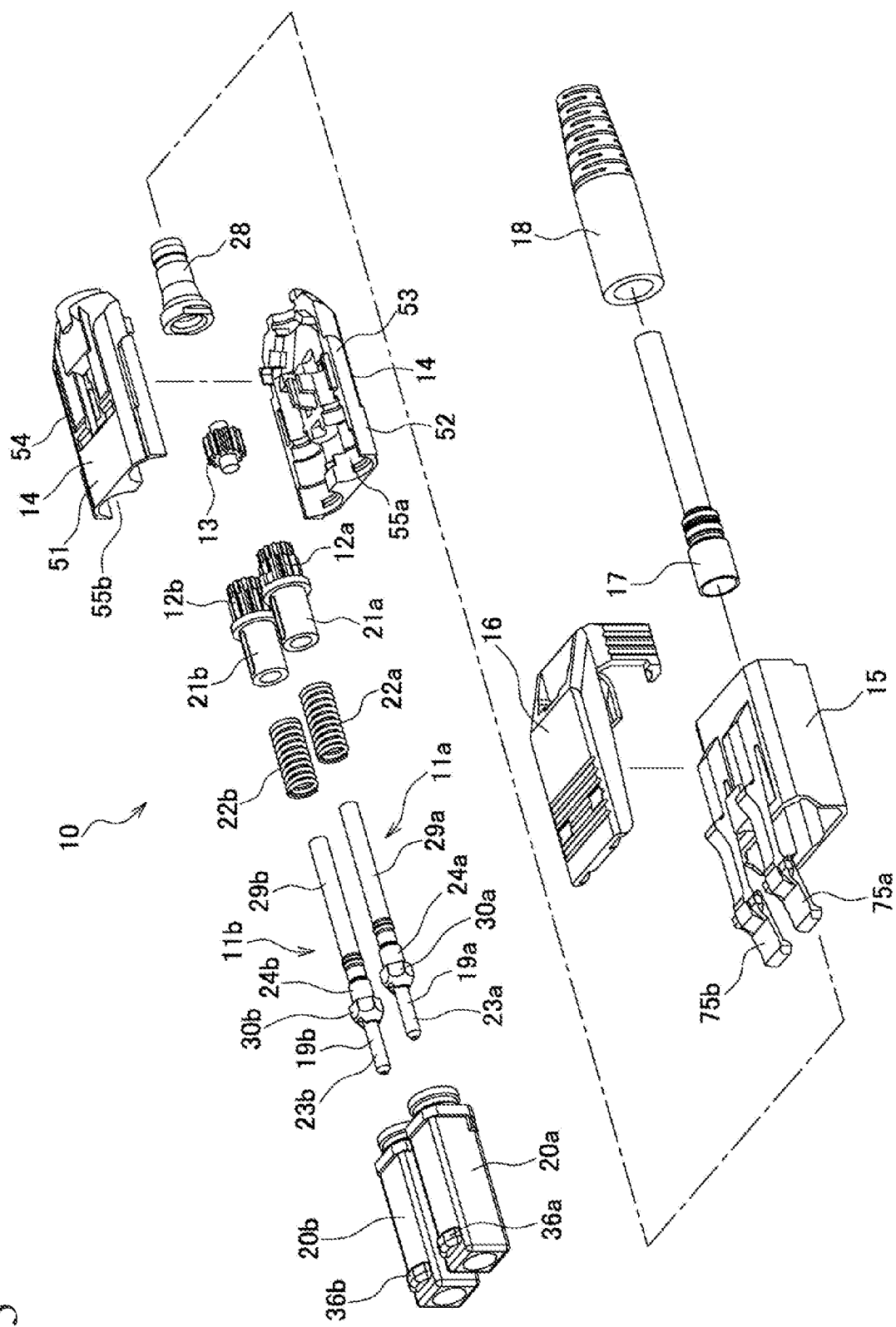
FIG. 3 is an exploded perspective view of the duplex optical connector plug.
Figure 4:
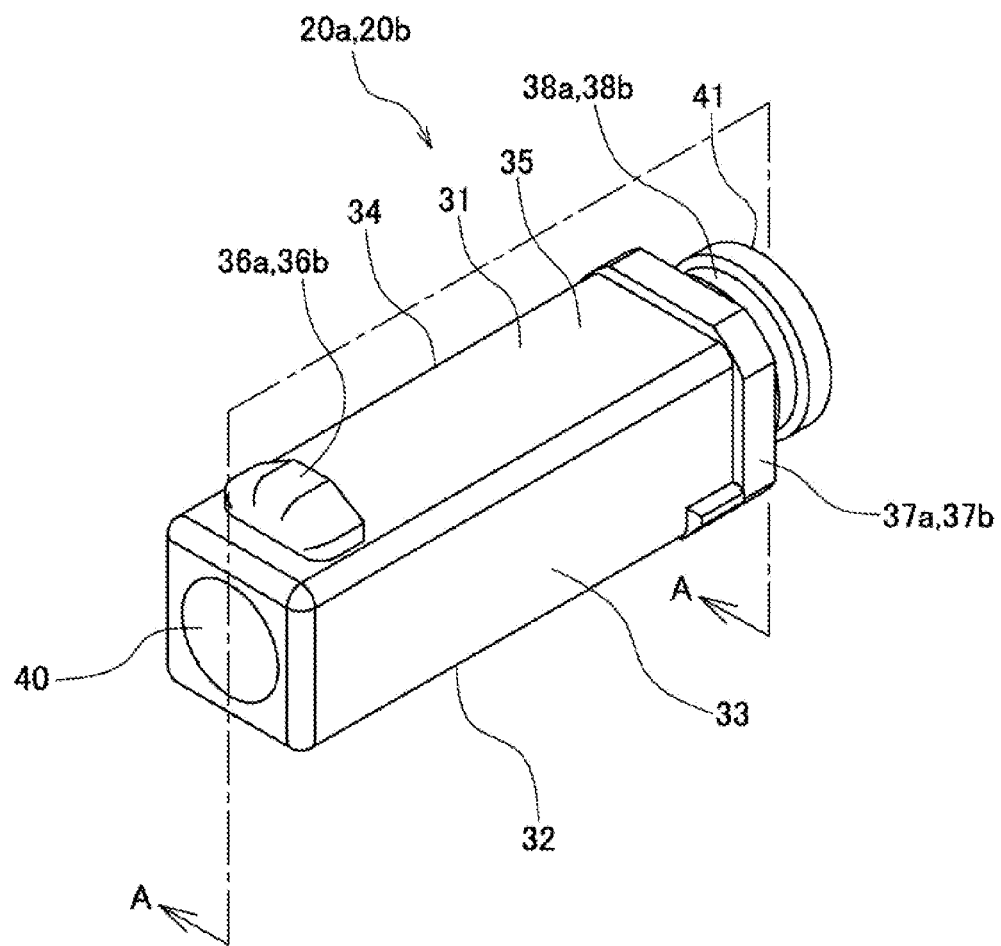
FIG. 4 is a perspective view of first and second plug frames.
Figure 5:
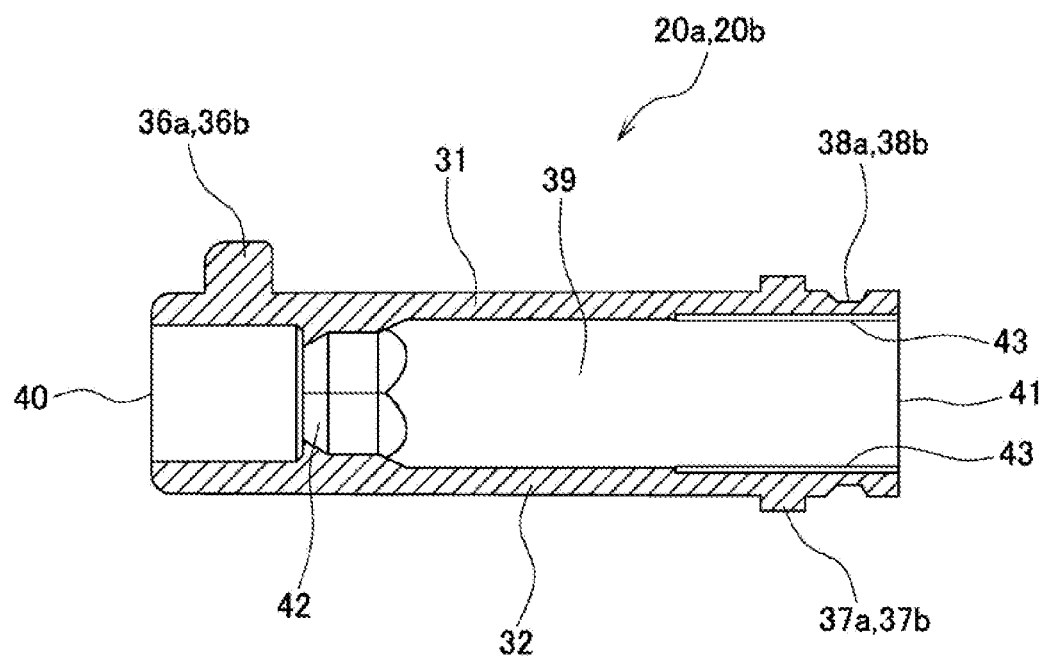
FIG. 5 is a cross-sectional view taken along line A-A in FIG. 4.
Figure 6:
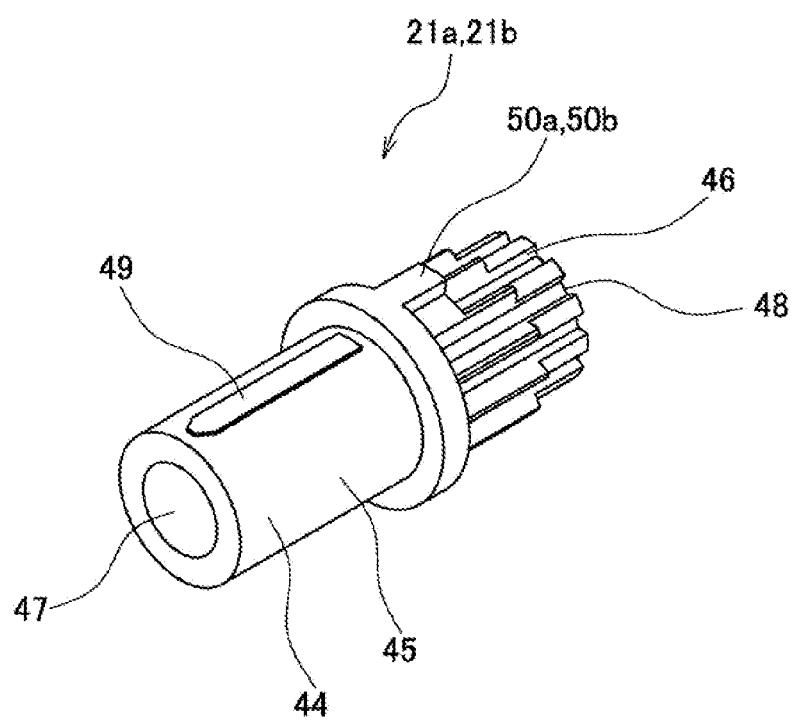
FIG. 6 is a perspective view of first and second stop rings.

Hereinafter, with reference to the drawings, a description will be given of a duplex optical connector plug 10 according to an embodiment. FIG. 1 is a perspective view of a duplex optical connector plug 10 according to an embodiment. FIG. 2 is a side view of the duplex optical connector plug 10. FIG. 3 is an exploded perspective view of the duplex optical connector plug 10. FIG. 4 is a perspective view of the first and second plug frames 20a, 20b. FIG. 5 is a cross-sectional view taken along line A-A in FIG. 4. FIG. 6 is a perspective view of first and second stop rings 21a, 21b. In FIGS. 1 and 2, the axial direction is indicated by arrow A; the radial direction (the lateral direction or the vertical direction) is indicated by arrow B; and the circumferential direction is indicated by arrow C.

The duplex optical connector plug 10 is mounted on a terminal part of an optical fiber cord 96 and connected to an optical connector adaptor (not illustrated) for establishing an optical connection between the optical fibers. The optical connector plug 10 includes: a first optical connector assembly 11a; a second optical connector assembly 11b; a first gear 12a; a second gear 12b; an intermediate gear 13; an inner housing 14; an outer housing 15; a slider 16; a crimping ring 17; a boot 18; and a pipe 28. As illustrated in FIG. 3, in the optical connector plug 10, the inner housing 14, the outer housing 15, the pipe 28, and the slider 16 are arranged in line on the axial rear side of the first and second optical connector assemblies 11a, 11b. The crimping ring 17 and the boot 18 are arranged in line on the axial rear side of the slider 16.

The first optical connector assembly 11a includes a first ferrule 19a, a first plug frame 20a, a first stop ring 21a, and a first spring 22a (a coil spring). The first ferrule 19a axially extends. The first plug frame 20a houses the first ferrule 19a. The first stop ring 21a is inserted into the first plug frame 20a. The first ferrule 19a includes a first capillary 23a and a first sleeve 24a. The first capillary 23a axially extends. The first sleeve 24a has a cylindrical shape and axially extends. The first capillary 23a retains at least one first optical fiber 25a.

The first capillary 23a has a substantially circular columnar shape that axially extends. The first capillary 23a includes a tip surface 26 and a chamfered part 27. The tip surface 26 is at the axial tip of the first capillary 23a, where an end surface of the first optical fiber 25a is exposed. The chamfered part 27 is at an outer diameter region of the end surface of the tip surface 26.

Note that, the shape of the chamfered part 27 may have any shape such as an angled plane or a rounded plane. The tip surface 26 is perpendicular to the radial direction. The chamfered part 27 is gradually inclined radially outward from the tip surface 26 axially rearward.

The first capillary 23a is formed of any ceramic material such as zirconia, a plastic material, any glass material such as crystallized glass, borosilicate glass, or quartz. The first capillary 23a according to the embodiment is a zirconia capillary formed of zirconia. The outer diameter of the first capillary 23a falls within a range of 1.2485 mm to 1.2495 mm. Inside the first capillary 23a (the first ferrule 19a), an axially extending optical fiber insert hole is formed (bored). The first optical fiber 25a is inserted into the optical fiber insert hole formed in the first capillary 23a.

The first sleeve 24a is coupled to the first capillary 23a (the first ferrule 19a) on its axial rear side. A first buffered fiber cover 29a (a PTFE tube) is coupled to the first sleeve 24a on its axial rear side. The first buffered fiber cover 29a covers the entire outer circumference of the first optical fiber 25a and axially extends.

At a front end of the first sleeve 24a, a first flange 30a having a polygonal prism shape is integrally formed. The diameter of the first flange 30a is greater than that of the first capillary 23a and the first buffered fiber cover 29a. The first sleeve 24a and the first flange 30a are formed of a metal material such as stainless steel, brass, or steel, or any synthetic resin material. Inside the first sleeve 24a, a capillary insert hole and a buffered fiber insert hole are formed (bored). The capillary insert hole retains the inserted first capillary 23a. The buffered fiber insert hole retains an inserted first buffered fiber including the first optical fiber 25a.

The rear end of the first capillary 23a is inserted into the capillary insert hole of the first sleeve 24a and fixedly retained. One end of the first buffered fiber is inserted into the buffered fiber insert hole of the first sleeve 24a and fixedly retained. Note that, the axial sectional shape of the first sleeve 24a is not specified to circular cylindrical, and may be polygonal prism that axially extends.

The first plug frame 20a is formed of a synthetic resin material. The first plug frame 20a is hollow and has a substantially quadrangular prism shape. The first plug frame 20a includes a top wall (a first top wall) 31, a bottom wall 32, and side walls 33, 34. The top wall 31 and the bottom wall 32 are substantially quadrangular. The top wall 31 and the bottom wall 32 vertically oppose to each other with a gap and axially extend. The side walls 33, 34 are substantially quadrangular. The side walls 33, 34 laterally oppose to each other with a gap and axially extend. On the axial front side of the top wall 31 of the first plug frame 20a, a first guide projection 36a is formed. The first guide projection 36a projects upward from an upper surface 35 of the top wall 31.

The walls 31 to 34 of the first plug frame 20a on the axial rear side are provided with a first flange 37a. The first flange 37a abuts on an opening edge of a first opening 55a of the inner housing 14, which will be described later. The first flange 37a is circumferentially formed at the walls 31 to 34 and surrounds the first plug frame 20a. The side walls 31 to 34 on the axial rear side of the first flange 37a of the first plug frame 20a are provided with a first engageable recess 38a. Into the first engageable recess 38a, a first engageable projection 57a formed immediately behind the first opening 55a of the inner housing 14, which will be described later, is inserted. The first engageable recess 38a is circumferentially formed at the walls 31 to 34 and surrounds the first plug frame 20a.

Inside the first plug frame 20a, ferrule housing space 39 is formed. The ferrule housing space 39 is surrounded by the walls 31 to 34 and axially extends. The first plug frame 20a includes a front end exposing opening 40 and a rear end insert opening 41. The tip of the first capillary 23a is exposed at the front end exposing opening 40. The first ferrule 19a is inserted from the rear end insert opening 41.

On the axial rear side of the front end exposing opening 40 of the first plug frame 20a, an abutting part 42 extends from the inner circumferential surface of the first plug frame 20a (the walls 31 to 34 surrounding the ferrule housing space 39) radially inward. On the abutting part 42, the first flange 30a of the first sleeve 24a abuts. By the first flange 30a of the first sleeve 24a abutting on the abutting part 42, the first sleeve 24a is prevented from shifting further axially frontward relative to the first plug frame 20a. The inner circumferential surface of the first plug frame 20a is provided with a pair of guide recesses 43. The guide recesses 43 extend axially frontward from the rear end insert opening 41.

The first stop ring 21a is formed of a metal material or a synthetic resin material to have a substantial cylindrical shape, and axially extends. The first stop ring 21a includes a front end 44 (a front end tube part), a rear end 46 (a rear end tube part), and an intermediate part 45 (an intermediate tube part). The front end 44 is positioned on the axial front side. The rear end 46 is positioned on the axial rear side. The intermediate part 45 extends between the front end 44 and the rear end 46. The first stop ring 21a includes a buffered fiber exposing opening 47 at the front end 44 and includes a buffered fiber insert opening 48 at the rear end 46. The first buffered fiber is exposed at the buffered fiber exposing opening 47. The first buffered fiber is inserted from the buffered fiber insert opening 48. At the front end 44 of the first stop ring 21a and the outer circumferential surface of the intermediate part 45, a pair of guide projections 49 that axially extends is formed. The guide projections 49 fit into the guide recesses 43 formed at the inner circumferential surface of the first plug frame 20a.

Inserting the first stop ring 21a into the first plug frame 20a includes the steps of: press-fitting the front end 44 of the first stop ring 21a to the rear end insert opening 41 of the first plug frame 20a; and shifting and press-fitting the first stop ring 21a axially frontward in the ferrule housing space 39 (inside) of the first plug frame 20a. Here, the first stop ring 21a is positioned relative to the first plug frame 20a by having the guide projections 49 of the first stop ring 21a aligned with the guide recesses 43 of the first plug frame 20a and having the guide projections 49 inserted into the guide recesses 43. By the front end 44 and the intermediate part 45 of the first stop ring 21a being press-fitted into the ferrule housing space 39 (inside) of the first plug frame 20a, the first stop ring 21a is fixedly coupled to the first plug frame 20a.

The first spring 22a is disposed between the first ferrule 19a and the first stop ring 21a. The first spring 22a is inserted into the first buffered fiber cover 29a and axially extends. The front end of the first spring 22a abuts on the first flange 30a of the first sleeve 24a. The rear end of the first spring 22a abuts on the front end 44 of the first stop ring 21a. The first spring 22a biases the first ferrule 19a axially frontward by the axial resilience.

The first gear 12a is formed at the rear end 46 of the first stop ring 21a and axially extends. The first gear 12a is provided with a first rotation stop projection 50a (rotation angle restricting means). The first rotation stop projection 50a projects radially outward in the first gear 12a. The height of the first rotation stop projection 50a is greater than the tooth length (tooth height) of the teeth of the first gear 12a, and projects radially outward than the teeth of the first gear 12a. The first rotation stop projection 50a opposes to a first rotation regulating projection 58a formed on the axial rear side of the first opening 55a of the inner housing 14, which will be described later.

The second optical connector assembly 11b is adjacent to the first optical connector assembly 11a and axially extends in parallel with the first optical connector assembly 11a. The second optical connector assembly 11b includes a second ferrule 19b, a second plug frame 20b, a second stop ring 21b, and a second spring 22b (coil spring). The second ferrule 19b, the second plug frame 20b, the second stop ring 21b, and the second spring 22b are structured similarly to the first ferrule 19a, the first plug frame 20a, the first stop ring 21a, and the first spring 22a, respectively. The second ferrule 19b includes a second capillary 23b and a second sleeve 24b. The second capillary 23b and the second sleeve 24b are structured similarly to the first capillary 23a and the first sleeve 24a, respectively. The second capillary 23b retains at least one second optical fiber 25b.

The second capillary 23b is laterally adjacent to the first capillary 23a, and axially extends in parallel with the first capillary 23a. Similarly to the first capillary 23a, the second capillary 23b includes a tip surface 26 and a chamfered part 27. The tip surface 26 is at the axial tip of the second capillary 23b, where an end surface of the second optical fiber 25b is exposed. Inside the second capillary 23b (the second ferrule 19b), an optical fiber insert hole that extends axially is formed (bored). The second optical fiber 25b is inserted into the optical fiber insert hole formed at the second capillary 23b. The material and outer diameter of the second capillary 23b are identical to those of the first capillary 23a.

The second sleeve 24b is coupled to the second capillary 23b (the second ferrule 19b) on its axial rear side. A second buffered fiber cover 29b (PTFE tube) is coupled to the second sleeve 24b on its axial rear side. The second buffered fiber cover 29b covers the entire outer circumference of the second optical fiber 25b and axially extends. The second buffered fiber cover 29b is laterally adjacent to the first buffered fiber cover 29a and axially extends in parallel with the first buffered fiber cover 29a.

At a front end of the second sleeve 24b, a second flange 30b having a polygonal prism shape is integrally formed. The diameter of the second flange 30b is greater than that of the second capillary 23b and the second buffered fiber cover 29b. The second flange 30b is laterally adjacent to the first flange 30a.

Similarly to the first sleeve 24a and the first flange 30a, the second sleeve 24b and the second flange 30b are formed of a metal material such as stainless steel, brass, or steel, or any synthetic resin material. Inside the second sleeve 24b, a capillary insert hole and a buffered fiber insert hole are formed (bored). The capillary insert hole retains the inserted second capillary 23b. The buffered fiber insert hole retains an inserted second buffered fiber including the second optical fiber 25b.

The rear end of the second capillary 23b is inserted into the capillary insert hole of the second sleeve 24b and fixedly retained. One end of the second buffered fiber is inserted into the buffered fiber insert hole of the second sleeve 24b and fixedly retained. Note that, the axial sectional shape of the second sleeve 24b is not specified to circular cylindrical, and may be polygonal prism that axially extends.

The second plug frame 20b is laterally adjacent to the first plug frame 20a and axially extends in parallel with the first plug frame 20a. The material and shape of the second plug frame 20b are similar to the first plug frame 20a. On the axial front side of the top wall (the second top wall) 31 of the second plug frame 20b, a second guide projection 36b is formed. The second guide projection 36b projects upward from an upper surface 35 of the top wall 31.

Note that, the first guide projection 36a and the second guide projection 36b function as guides in inserting the first and second plug frames 20a, 20b of the optical connector plug 10 into the optical connector adaptor.

The walls 31 to 34 on the axial rear side of the second plug frame 20b are provided with a second flange 37b. The second flange 37b abuts on an opening edge of a second opening 55b of the inner housing 14, which will be described later. The second flange 37b is circumferentially formed at the walls 31 to 34 and surrounds the second plug frame 20b. The side walls 31 to 34 on the axial rear side of the second flange 37b of the second plug frame 20b are provided with a second engageable recess 38b. Into the second engageable recess 38b, a second engageable projection 57b formed immediately behind the second opening 55b of the inner housing 14, which will be described later, is inserted. The second engageable recess 38b is circumferentially formed at the walls 31 to 34 and surrounds the second plug frame 20b.

The second plug frame 20b is structured similarly to the first plug frame 20a.

The second stop ring 21b is laterally adjacent to the first stop ring 21a, and axially extends in parallel with the first stop ring 21a. The second stop ring 21b is structured similarly to the first stop ring 21a.

The second spring 22b is disposed between the second ferrule 19b and the second stop ring 21b. The second spring 22b is inserted into the second buffered fiber cover 29b. The second spring 22b is laterally adjacent to the first spring 22a, and axially extends in parallel to the first spring 22a. The front end of the second spring 22b abuts on the second flange 30b of the second sleeve 24b. The rear end of the second spring 22b abuts on the front end 44 of the second stop ring 21b. The second spring 22b biases the second ferrule 19b axially frontward by the axial resilience.

The second gear 12b is formed at the rear end 46 of the second stop ring 21b and axially extends. The second gear 12b is structured similarly to the first gear 12a.

The intermediate gear 13 is interposed between the first gear 12a and the second gear 12b and axially extends. The intermediate gear 13 is circumscribed to the first and second gears 12a, 12b, to transfer the rotational force of one of the first and second gears 12a, 12b to the other gear and rotate the other gear in the direction identical to the one gear. Note that, the gear ratio of the first gear 12a, the second gear 12b, and the intermediate gear 13 is 1:1:1. Accordingly, when the first gear 12a makes one turn clockwise, the intermediate gear 13 makes one turn counterclockwise and the second gear 12b makes one turn clockwise. Conversely, when the first gear 12a makes one turn counterclockwise, the intermediate gear 13 makes one turn clockwise and the second gear 12b makes one turn counterclockwise.

Figure 7:
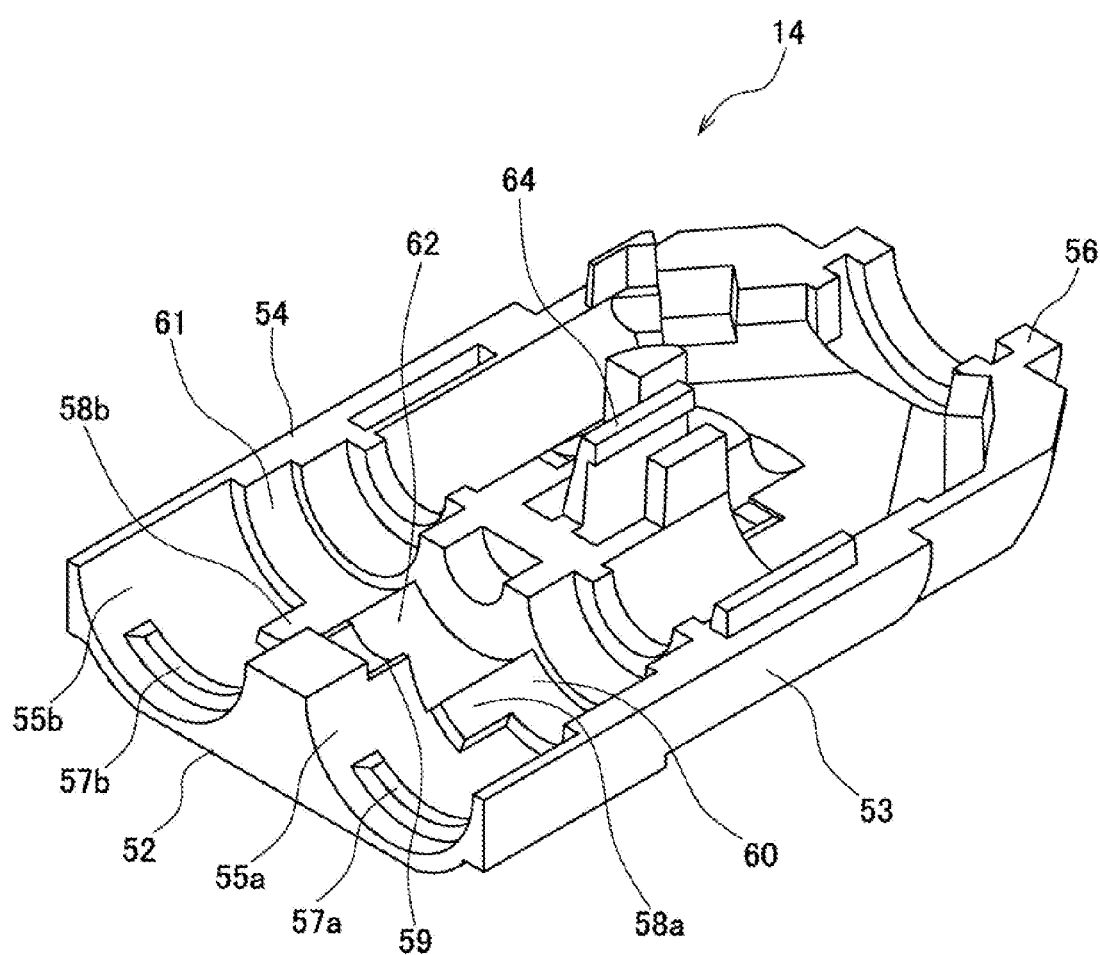
FIG. 7 is a perspective view of an inner housing as being halved.
Figure 8:
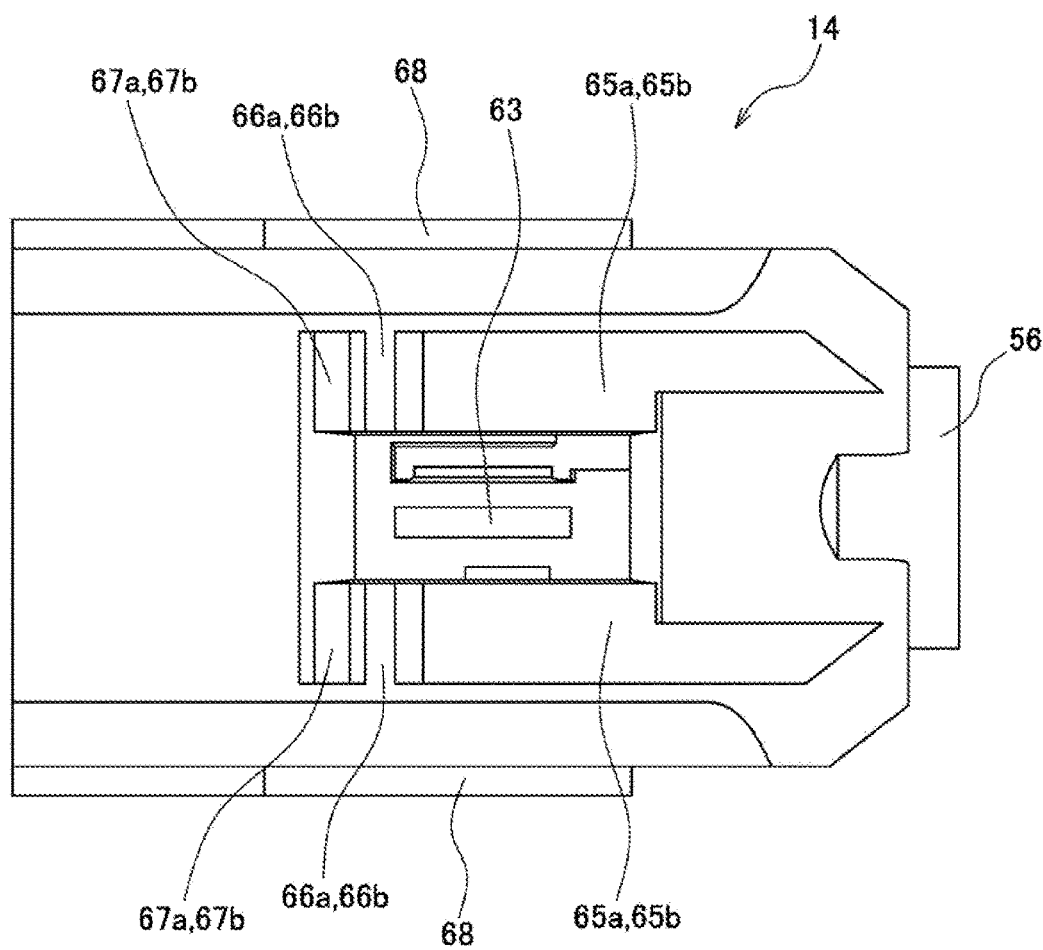
FIG. 8 illustrates the appearance of the inner housing.

FIG. 7 is a perspective view of the inner housing 14 as being halved. FIG. 8 illustrates the appearance of the inner housing 14. The inner housing 14 is formed of a synthetic resin material to have a hollow shape. The inner housing 14 includes a top wall 51, a bottom wall 52, and side walls 53, 54. The top wall 51 and the bottom wall 52 vertically oppose to each other with a gap and axially extend. The side walls 53, 54 laterally oppose to each other with a gap and axially extend. The inner housing 14 includes, at its front end, a first opening 55a and a second opening 55b. The first stop ring 21a is inserted into the first opening 55a. The second stop ring 21b is inserted into the second opening 55b.

A tube part 56 for fitting in the pipe 28 is integrally coupled to the inner housing 14 on its axial rear side. Inside the inner housing 14 immediately behind the first opening 55a, a first engageable projection 57a is formed. Inside the inner housing 14 immediately behind the second opening 55b, a second engageable projection 57b is formed. The first engageable projection 57a and the second engageable projection 57b project radially inward from the inside of the inner housing 14.

As illustrated in FIG. 7, inside the inner housing 14 on the axial rear side of the first opening 55a, a first rotation regulating projection 58a (rotation angle restricting means) is formed. Inside the inner housing 14 on the axial rear side of the second opening 55b, a second rotation regulating projection 58b (rotation angle restricting means) is formed. The first rotation regulating projection 58a and the second rotation regulating projection 58b project radially inward from the inside of the inner housing 14.

Inside the inner housing 14, a first gear housing part 60, a second gear housing part 61, and an intermediate gear housing part 62 are formed. The first gear housing part 60 and the second gear housing part 61 are respectively surrounded by the walls 51 to 54 and a partition wall 59. The intermediate gear housing part 62 is surrounded by the partition wall 59 and positioned between the first and second gear housing parts 60, 61.

The first gear housing part 60 rotatably houses the first gear 12a formed at the rear end 46 of the first stop ring 21a. The second gear housing part 61 rotatably houses the second gear 12b formed at the rear end 46 of the second stop ring 21b. The intermediate gear housing part 62 rotatably houses the intermediate gear 13. On the axial rear side (immediately behind) of the intermediate gear housing part 62 of the inner housing 14, a fitting hole 63 and a fitting hook 64 are formed. The fitting hole 63 is formed to penetrate through the top wall 51 and the bottom wall 52 of the inner housing 14. The fitting hook 64 fits into the fitting hole 63. The fitting hook 64 extends inward in the radial direction from the inside of the inner housing 14.

As illustrated in FIG. 8, at one lateral side and the other lateral side of the top wall 51 of the inner housing 14, a pair of first guide grooves 65a, a pair of first projections 66a, and a pair of first recesses 67a are formed. The pair of first guide grooves 65a axially extends in parallel with each other. The pair of first projections 66a projects upward from the upper surfaces of the first guide grooves 65a. The pair of first recesses 67a is recessed downward from the upper surfaces of the first guide grooves 65a. The first projections 66a are continuous to the first guide grooves 65a and formed on the axial front side of the first guide grooves 65a. The first recesses 67a are continuous to the first projections 66a and formed on the immediate axial front side of the first projections 66a.

At one lateral side and the other lateral side of the bottom wall 52 of the inner housing 14, a pair of second guide grooves 65b, a pair of second projections 66b, and a pair of second recesses 67b are formed. The pair of second guide grooves 65b axially extends in parallel with each other. The pair of second projections 66b project downward from the lower surfaces of the second guide grooves 65b. The pair of second recesses 67b is recessed upward from the lower surfaces of the second guide grooves 65b. The second projections 66b are continuous to the second guide grooves 65b and formed on the axial front side of the second guide grooves 65b. The second recesses 67b are continuous to the second projections 66b and formed on the immediate axial front side of the second projections 66b. The side walls 53, 54 of the inner housing 14 are respectively provided with guide projections 68 projecting outward in the width direction from the side walls 53, 54 and axially extend.

In the inner housing 14, the first and second gears 12a, 12b are housed in the first and second gear housing parts 60, 61, and the intermediate gear 13 is housed in the intermediate gear housing part 62. Thus, the gears 12a, 12b, 13 are laterally juxtaposed to one another, while the first gear 12a and the intermediate gear 13 are circumscribed to each other and the second gear 12b and the intermediate gear 13 are circumscribed to each other. The inner housing 14 is made up of a combination of two horizontally separated components of the inner housing 14 which are identical in outer shape and size. In coupling the components of the inner housing 14, the lower component of the fitting hook 64 of the inner housing 14 fits into the fitting hole 63 of the upper component of the inner housing 14, and the fitting hook 64 of the upper component of the inner housing 14 fits into the fitting hole 63 of the lower component of the inner housing 14. Thus, the components of the inner housing 14 are fixed and integrated.

Into the first engageable recess 38a of the first plug frame 20a, the first engageable projection 57a of the inner housing 14 is inserted, and the first plug frame 20a is coupled to the inner housing 14 so as to be capable of rotating. Into the second engageable recess 38b of the second plug frame 20b, the second engageable projection 57b of the inner housing 14 is inserted, and the second plug frame 20b is coupled to the inner housing 14 so as to be capable of rotating. The pipe 28 is formed of a metal material such as stainless steel, brass, aluminum alloy, or steel. The pipe 28 is coupled to the crimping ring 17 and coupled to the tube part 56 of the inner housing 14.

Figure 9:
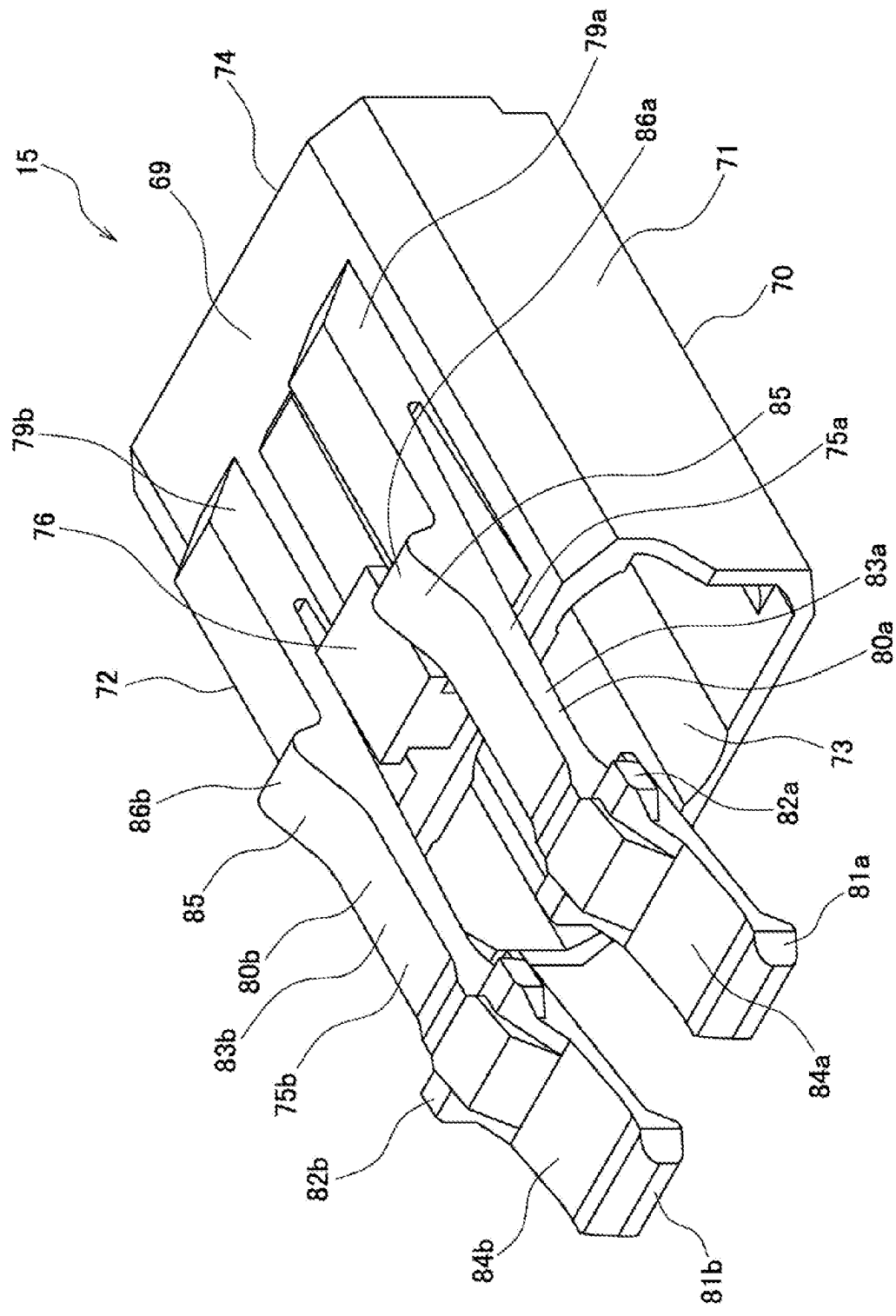
FIG. 9 is a perspective view of an outer housing.
Figure 10:
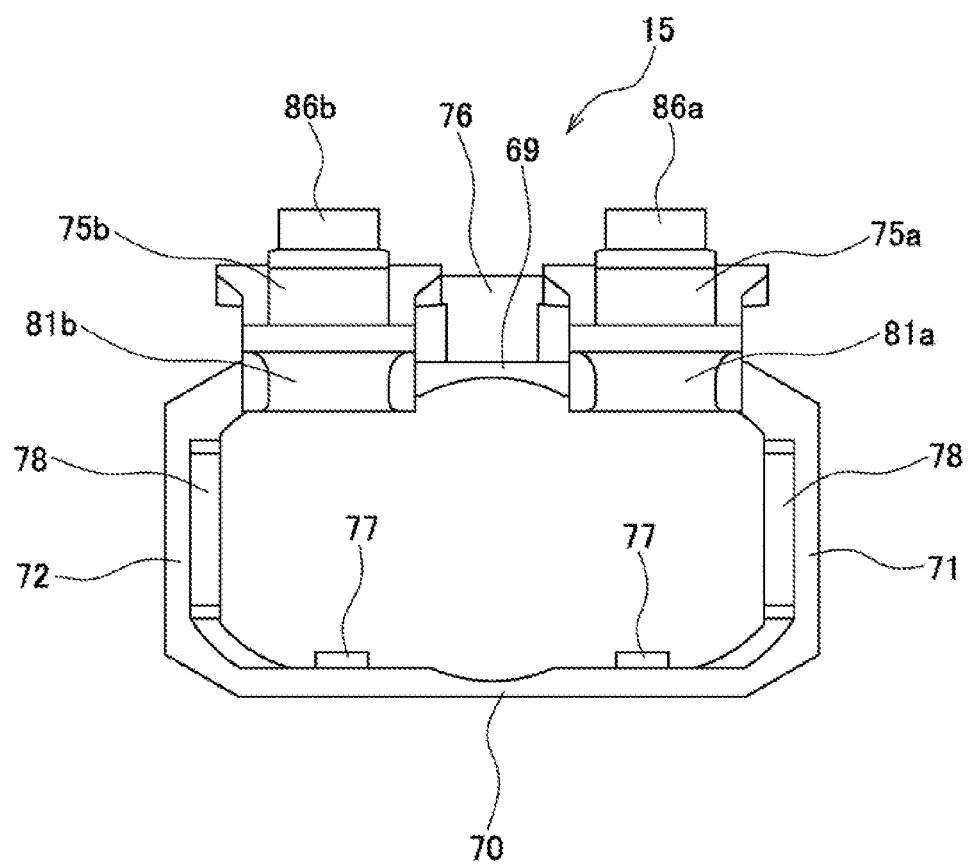
FIG. 10 is a front view of the outer housing.

FIG. 9 is a perspective view of the outer housing 15. FIG. 10 is a front view of the outer housing 15. The outer housing 15 is formed of a synthetic resin material. The outer housing 15 includes a top wall (third top wall) 69, a substantially quadrangular bottom wall 70, and side walls 71, 72. The top wall 69 and the bottom wall 70 vertically oppose to each other with a gap and axially extend. The side walls 71, 72 laterally oppose to each other with a gap and axially extend. The outer housing 15 includes a front end opening 73, a rear end opening 74, a first engagement latch 75a, and a second engagement latch 75b. The front end opening 73 opens at the front end of the outer housing 15. The rear end opening 74 opens at the rear end of the outer housing 15. The first engagement latch 75a and the second engagement latch 75b are elastically deformable and coupled to the top wall 69.

At the center in the width direction of the front end of the top wall 69 of the outer housing 15, an engageable-insert key 76 that axially extends is formed. The engageable-insert key 76 extends upward from the upper surface of the top wall 69. At the center in the front-rear direction of one lateral side and other lateral side of the bottom wall 70 of the outer housing 15, a pair of engagement projections 77 is formed. The pair of engagement projections 77 projects upward from the inner surface of the bottom wall 70 toward the top wall 69. The side walls 71, 72 of the outer housing 15 are provided with a pair of guide recesses 78. The pair of guide recesses 78 is recessed outward in the width direction from the inner surfaces of the side walls 71, 72. The guide recesses 78 axially extend from the front end opening 73 of the outer housing 15 toward the rear end opening 74.

The first and second engagement latches 75a, 75b oppose to each other with a gap of a predetermined dimension in the width direction and axially extend straight in parallel with each other. The first engagement latch 75a is positioned on one lateral side of the top wall 69 of the outer housing 15. The first engagement latch 75a includes a first coupling part 79a and a first elastic deformation part 80a. The first coupling part 79a is coupled to the rear half of the one lateral side of the top wall 69 and integrated with the outer housing 15. The first elastic deformation part 80a is continuous to the first coupling part 79a and extends from the first coupling part 79a axially frontward. The first engagement latch 75a includes a first abutting projection 81a and a first engagement part 82a. The first abutting projection 81a is formed at the front end of the first engagement latch 75a. The first engagement part 82a is formed on the axial rear side of the first abutting projection 81a and extends in the width direction.

The first elastic deformation part 80a is flexible and elastically deforms vertically. The first elastic deformation part 80a includes a first horizontal portion 83a and a first inclined portion 84a. The first horizontal portion 83a is continuous to the first coupling part 79a and extends horizontally from the first coupling part 79a axially frontward. The first inclined portion 84a is continuous to the first horizontal portion 83a and extends axially frontward from the first horizontal portion 83a. The rear half of the first horizontal portion 83a is in parallel with the top wall 69 of the outer housing 15 above the top wall 69 with a gap. The front half of the first horizontal portion 83a extends axially frontward from the front end opening 73. The first inclined portion 84a is inclined downward so as to gradually approach the top wall 31 of the first plug frame 20a axially frontward. At the first horizontal portion 83a, a first inclined projection 86a (a push-down mechanism) is formed. The first inclined projection 86a includes an inclined surface 85 that is inclined upward axially rearward.

The thickness dimension of the first inclined portion 84a is smaller than that of the first horizontal portion 83a. The resilience of the first inclined portion 84a is smaller than that of the first horizontal portion 83a. The first abutting projection 81a extends downward from the front end of the first inclined portion 84a toward the top wall 31 of the first plug frame 20a, to abut on the front end positioned on the axial front side of the top wall 31. The first engagement part 82a is positioned in front of the front half of the first horizontal portion 83a, and engages with the optical connector adaptor when the first optical connector assembly 11a is inserted into the optical connector adaptor.

The second engagement latch 75b is positioned on the other lateral side of the top wall 69 of the outer housing 15. The second engagement latch 75b is structured similarly to the first engagement latch 75a.

The outer housing 15 is capable of housing the inner housing 14 having the top wall 51 of the inner housing 14 opposed to the top wall 69 of the outer housing 15 and having the bottom wall 52 of the inner housing 14 opposed to the bottom wall 70 of the outer housing 15. Conversely, the outer housing 15 is capable of housing the inner housing 14 having the bottom wall 52 of the inner housing 14 opposed to the top wall 69 of the outer housing 15 and having the top wall 51 of the inner housing 14 opposed to the bottom wall 70 of the outer housing 15. In this manner, the outer housing 15 is capable of housing the inner housing 14 upside down.

For example, the outer housing 15 houses the inner housing 14 having the top wall 51 of the inner housing 14 opposed to the top wall 69 of the outer housing 15. Here, the engagement projections 77 formed at the bottom wall 70 of the outer housing 15 slidably enter the first and second guide grooves 65a, 65b formed at the bottom wall 52 of the inner housing 14. The guide projections 68 formed at the side walls 53, 54 of the inner housing 14 enter the guide recesses 78 formed at the side walls 71, 72 of the outer housing 15.

Inside the outer housing 15, the inner housing 14 is further pushed-in axially rearward. Here, the engagement projections 77 of the outer housing 15 shift axially rearward in the first and second guide grooves 65a, 65b of the inner housing 14, and the guide projections 68 of the inner housing 14 shift axially rearward in the guide recesses 78 of the outer housing 15. The engagement projections 77 of the outer housing 15 pass over the first and second projections 66a, 66b formed at the inner housing 14, and the engagement projections 77 of the outer housing 15 are inserted into the first and second recesses 67a, 67b formed at the bottom wall 52 of the inner housing 14. Thus, the inner housing 14 is fixedly coupled to the inside of the outer housing 15.

Figure 11:
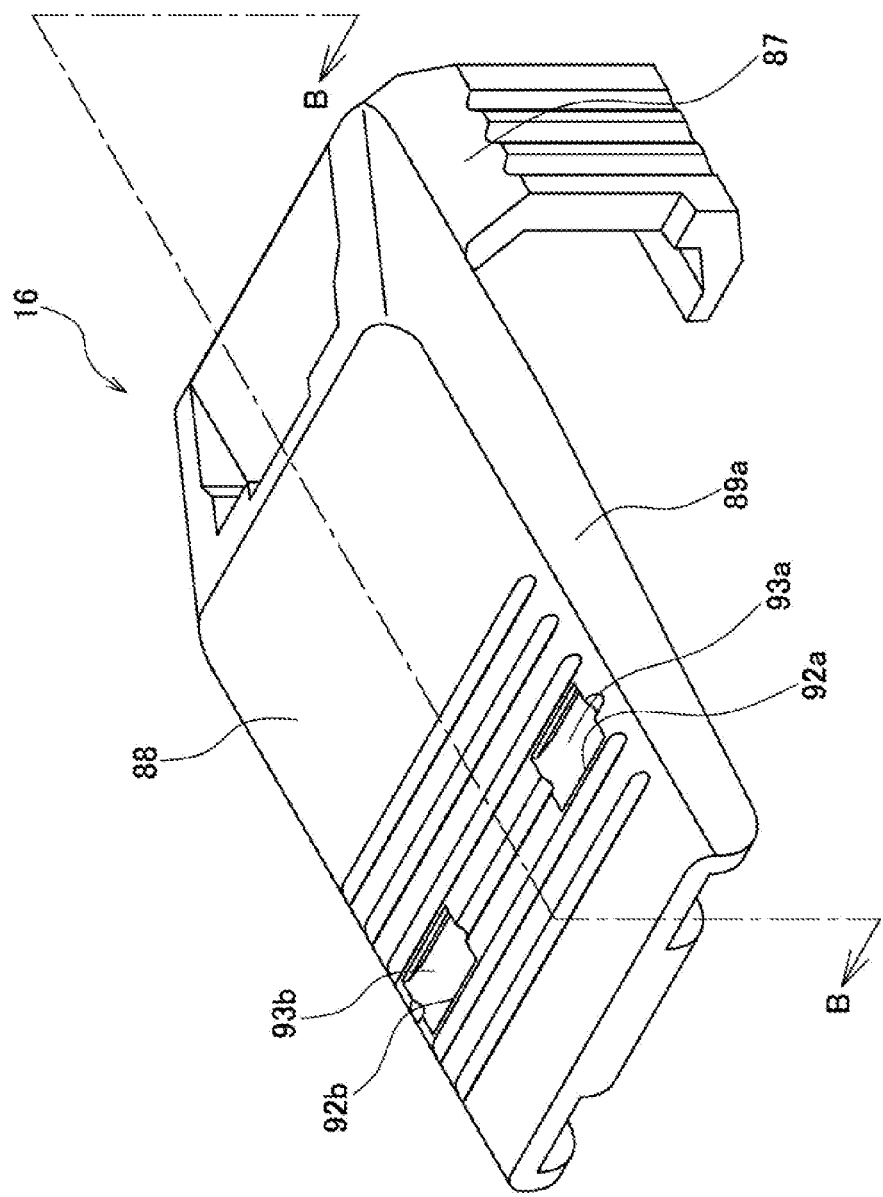
FIG. 11 is a perspective view of a slider as seen from above.
Figure 12:
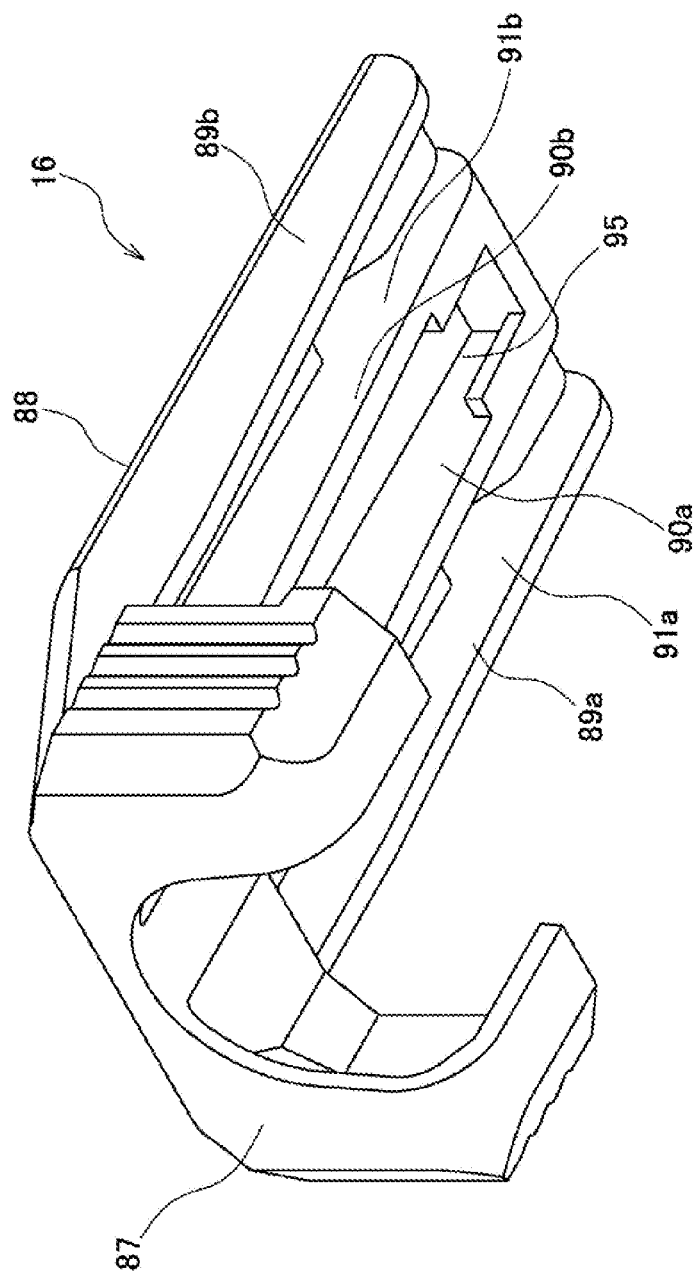
FIG. 12 is a perspective view of the slider as seen from below.
Figure 13:
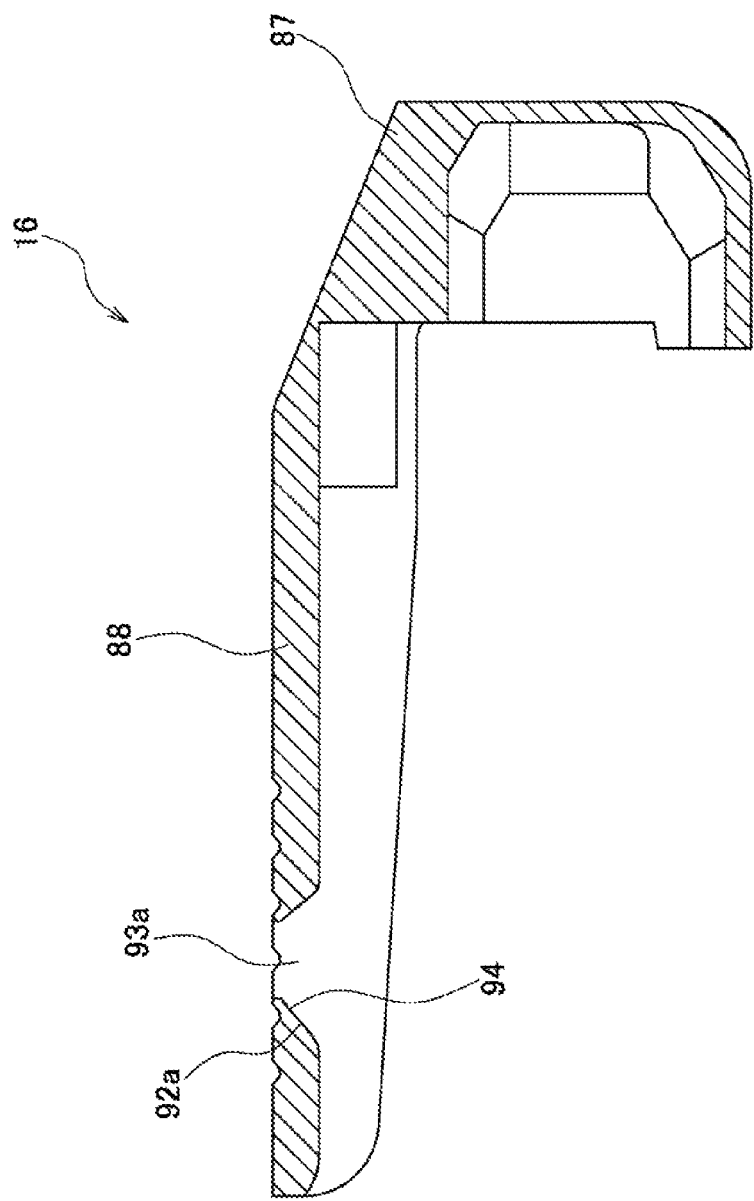
FIG. 13 is a cross-sectional view taken along line B-B in FIG. 11.

FIG. 11 is a perspective view of the slider 16 as seen from above. FIG. 12 is a perspective view of the slider 16 as seen from below. FIG. 13 is a cross-sectional view taken along line B-B in FIG. 11. The slider 16 is axially slidably coupled to the outer housing 15. The slider 16 is formed of a synthetic resin material. The slider 16 includes a frame 87 and a sliding top wall 88 (a sliding plate). The frame 87 is disposed behind the rear end opening 74 of the outer housing 15. The sliding top wall 88 extends axially frontward from the top part of the frame 87.

At the sliding top wall 88, a first outer guide wall 89a, a first inner guide wall 90a, a second outer guide wall 89b, and a second inner guide wall 90b are formed. The first outer guide wall 89a extends downward from one side edge of the sliding top wall 88 and axially extends. The first inner guide wall 90a is positioned on the inner side in the width direction than the first outer guide wall 89a and axially extends while extending downward at the center in the width direction of the sliding top wall 88. The second outer guide wall 89b axially extends while extending downward from the other side edge of the sliding top wall 88. The second inner guide wall 90b is positioned on the inner side in the width direction than the second outer guide wall 89b and axially extends while extending downward at the center in the width direction of the sliding top wall 88.

Along one lateral side of the sliding top wall 88, a first entry path 91a is formed. The first entry path 91a axially extends between the first outer guide wall 89a and the first inner guide wall 90a for allowing the entry of the first coupling part 79a of the first engagement latch 75a and the rear half of the first elastic deformation part 80a. Along the other lateral side of the sliding top wall 88, a second entry path 91b is formed. The second entry path 91b axially extends between the second outer guide wall 89b and the second inner guide wall 90b for allowing the entry of a second coupling part 79b of the second engagement latch 75b and the rear half of a second elastic deformation part 80b.

On the front side of the first entry path 91a of the slider 16, a first through hole 93a is formed. The first through hole 93a includes a first inclined recess 92a (a push-down mechanism) recessed toward the upper surface of the slider 16. The first inclined recess 92a includes an inclined surface 94 inclined upward axially rearward. The first inclined projection 86a of the first engagement latch 75a enters the first through hole 93a, and the inclined surface 85 of the first inclined projection 86a slidably abuts on the inclined surface 94 of the first inclined recess 92a.

On the front side of the second entry path 91b of the slider 16, a second through hole 93b is formed. The second through hole 93b is structured similarly to the first through hole 93a.

Between the first inner guide wall 90a and the second inner guide wall 90b at the center in the width direction of the sliding top wall 88, a key engageable-insert part 95 is formed. Into the key engageable-insert part 95, the engageable-insert key 76 formed at the center in the width direction at the front end of the top wall 69 of the outer housing 15 is inserted.

By the engageable-insert key 76 of the outer housing 15 being inserted into the key engageable-insert part 95 of the slider 16, the slider 16 is coupled to the outer housing 15. In the state where the slider 16 is coupled to the outer housing 15, the frame 87 of the slider 16 is positioned on the axial rear side (immediately behind) of the rear end opening 74 of the outer housing 15. Then, the first coupling part 79a of the first engagement latch 75a and the rear half of the first elastic deformation part 80a enter the first entry path 91a of the slider 16, and the second coupling part 79b of the second engagement latch 75b and the rear half of the second elastic deformation part 80b enter the second entry path 91b of the slider 16.

The first inclined projection 86a of the first engagement latch 75a enters the first through hole 93a of the slider 16, and the inclined surface 85 of the first inclined projection 86a slidably abuts on the inclined surface 94 of the first inclined recess 92a. A second inclined projection 86b of the second engagement latch 75b enters the second through hole 93b of the slider 16, and an inclined surface 85 of the second inclined projection 86b slidably abuts on the inclined surface 94 of the second inclined recess 92b. The slider 16 axially slides frontward and rearward by the axial length dimension of the first and second inclined recesses 92a. 92b at the upper surface of the top wall 69 of the outer housing 15.

The crimping ring 17 is formed of a metal material or a synthetic resin material to have a substantial cylindrical shape and axially extends. The pipe 28 is inserted into the tube part 56 positioned on the axial rear side of the inner housing 14. The boot 18 is formed of a metal material or a synthetic resin material to have a substantial cylindrical shape and axially extends. The boot 18 is fitted into the tube part 56 of the inner housing 14 via the crimping ring 17 and the pipe 28 so that the inner circumferential surface of the boot 18 and the outer circumferential surface at the front end of the crimping ring 17 are closely in contact with each other. Note that, the first buffered fiber including the first optical fiber 25a and the second buffered fiber including the second optical fiber 25b are integrated in the inner housing 14 to serve as the optical fiber cord 96. The optical fiber cord 96 is inserted into the crimping ring 17 and the boot 18 and extends axially rearward from the rear end of the boot 18.

By the first rotation stop projection 50a formed at the first gear 12a abutting on the first rotation regulating projection 58a formed at the inner housing 14, the rotation of the first optical connector assembly 11a (the first stop ring 21a) is stopped. By a second rotation stop projection 50b formed at the second gear 12b abutting on the second rotation regulating projection 58b formed at the inner housing 14, the rotation of the second optical connector assembly 11b (the second stop ring 21b) is stopped.

The formation range (formation position) of the first rotation stop projection 50a and the second rotation stop projection 50b in the first and second gears 12a, 12b or the formation range (formation position) of the first rotation regulating projection 58a and the second rotation regulating projection 58b in the inner housing 14 determines the rotation angle (rotation range) of the first and second optical connector assemblies 11a. 11b (the first and second stop rings 21a, 21b). In the optical connector plug 10, the rotation range of the first and second optical connector assemblies 11a, 11b from the rotation start point to the rotation end point is set to a half-turn (i.e., the rotation angle of 180 degrees).

As in FIGS. 1 and 2, in the assembled duplex optical connector plug 10, the front end of the first inclined portion 84a of the first engagement latch 75a is positioned immediately behind the rear end of the first guide projection 36a of the first plug frame 20a. The first abutting projection 81a abuts on the upper surface 35 of the first plug frame 20a. The front end of a second inclined portion 84b of the second engagement latch 75b is positioned immediately behind the rear end of the second guide projection 36b of the second plug frame 20b. A second abutting projection 81b abuts on the upper surface 35 of the second plug frame 20b.

The first coupling part 79a of the first engagement latch 75a is coupled to the top wall 69 of the outer housing 15, and the first abutting projection 81a of the first engagement latch 75a abuts on the upper surface 35 of the first plug frame 20a. Thus, as compared to the case where the first elastic deformation part 80a of the first engagement latch 75a becomes spaced apart upward from the top wall 31 of the first plug frame 20a, the vertical resilience of the first elastic deformation part 80a (the first horizontal portion 83a and the first inclined portion 84a) becomes great.

The second coupling part 79b of the second engagement latch 75b is coupled to the top wall 69 of the outer housing 15, and the second abutting projection 81b of the second engagement latch 75b abuts on the upper surface 35 of the second plug frame 20b. Thus, as compared to the case where the second elastic deformation part 80b of the second engagement latch 75b becomes spaced apart upward the top wall 31 of the second plug frame 20b, the vertical resilience of the second elastic deformation part 80b (a second horizontal portion 83b and the second inclined portion 84b) becomes great.

The first and second optical connector assemblies 11a, 11b are inserted into an optical connector adaptor (not illustrated) and the first and second optical connector assemblies 11a, 11b are pushed into the optical connector adaptor. Here, while the first and second elastic deformation parts 80a, 80b of the first and second engagement latches 75a, 75b elastically deform downward, the first and second engagement parts 82a. 82b engage with the engagement part of the optical connector adaptor and the optical connector plug 10 is coupled to the optical connector adaptor, whereby the optical connection is established. In the state before the slider 16 is slid axially rearward relative to the outer housing 15, the first and second elastic deformation parts 80a, 80b are not pushed downward, and the engagement between the first and second optical connector assemblies 11a, 11b (the first and second engagement parts 82a. 82b) and the optical connector adaptor is maintained.

When the slider 16 is slid axially rearward relative to the outer housing 15, the inclined surface 94 of the first inclined recess 92a of the slider 16 pushes downward the inclined surface 85 of the first inclined projection 86a of the first engagement latch 75a and the first inclined recess 92a pushes downward the first inclined projection 86a. Thus, the first elastic deformation part 80a of the first engagement latch 75a is pushed downward. Furthermore, the inclined surface 94 of the second inclined recess 92b of the slider 16 pushes downward the inclined surface 85 of the second inclined projection 86b of the second engagement latch 75b and the second inclined recess 92b pushes downward the second inclined projection 86b. Thus, the second elastic deformation part 80b of the second engagement latch 75b is pushed downward.

When the first and second elastic deformation parts 80a, 80b of the first and second engagement latches 75a, 75b are pushed downward, the engagement between the first and second engagement parts 82a, 82b and the optical connector adaptor is cancelled. This allows the first and second optical connector assemblies 11a, 11b to be removed from the optical connector adaptor to cancel the coupling (optical connection) between the optical connector plug 10 and the optical connector adaptor.

Figure 14:
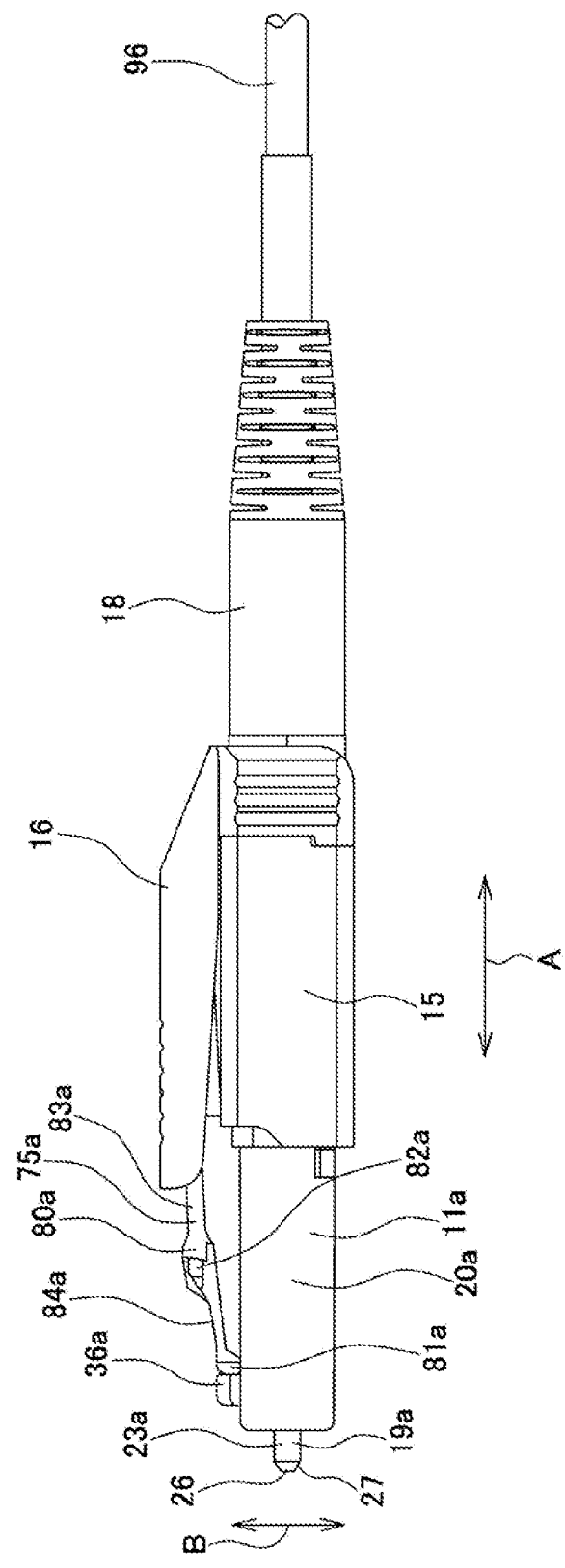
FIG. 14 is a side view of an optical connector plug when a great tensile load acts on the optical connector plug.

FIG. 14 is a side view of the optical connector plug 10 when a great tensile load acts on the optical connector plug 10. In the state where the first and second optical connector assemblies 11a, 11b (the first and second engagement latches 75a, 75b) are inserted into and coupled to the optical connector adaptor, when the optical connector plug 10 is pulled with a great force in the direction of decoupling it from the optical connector adaptor, a great axial (axially rearward) tensile load acts on the first and second engagement latches 75a, 75b. Then, as the first and second elastic deformation parts 80a, 80b of the first and second engagement latches 75a, 75b elastically deform and are axially stretched, as in FIG. 14, the front end of the first inclined portion 84a of the first engagement latch 75a abuts on the rear end of the first guide projection 36a and the front end of the second inclined portion 84b of the second engagement latch 75b abuts on the rear end of the second guide projection 36b.

This suppresses the downward elastic deformation of the first and second elastic deformation parts 80a, 80b, thereby preventing cancellation of the engagement between the first and second engagement parts 82a, 82b and the optical connector adaptor. That is, the coupled state (engaged state) between the optical connector plug 10 (the first and second engagement parts 82a, 82b) and the optical connector adaptor is maintained.

In a coupled state where the first and second optical connector assemblies 11a, 11b are inserted into and coupled to the optical connector adaptor, when the optical connector plug 10 is pulled with a great force in the direction of decoupling it from the optical connector adaptor, a great axial tensile load acts on the first and second engagement latches 75a, 75b. Then, as the first and second elastic deformation parts 80a, 80b elastically deform and are axially stretched, the front end of the first inclined portion 84a of the first engagement latch 75a abuts on the rear end of the first guide projection 36a and the front end of the second inclined portion 84b of the second engagement latch 75b abuts on the rear end of the second guide projection 36b. This suppresses the downward elastic deformation of the first and second elastic deformation parts 80a, 80b, whereby the engagement between the first and second engagement parts 82a, 82b and the optical connector adaptor is maintained. Accordingly, the coupling between the optical connector plug 10 and the optical connector adaptor will not be cancelled accidentally, and the optical connection with the optical connector adaptor is maintained.

The axial distance dimension between the front end of the first inclined portion 84a of the first engagement latch 75a and the rear end of the first guide projection 36a falls within a range of 0.1 mm to 0.6 mm. The axial distance dimension between the front end of the second inclined portion 84b of the second engagement latch 75b and the rear end of the second guide projection 36b falls within a range of 0.1 mm to 0.6 mm. When the axial distance dimension between the front end of the first inclined portion 84a and the rear end of the first guide projection 36a exceeds 0.6 mm and the axial distance dimension between the front end of the second inclined portion 84b and the rear end of the second guide projection 36b exceeds 0.6 mm, the optical connector plug 10 is pulled in the direction of cancelling the coupling with the optical connector adaptor, whereby an axial (axially rearward) tensile load occurs at the first and second engagement latches 75a. 75b. Accordingly, when the first and second elastic deformation parts 80a, 80b elastically deform and are axially stretched, the front end of the first inclined portion 84a does not abut on the rear end of the first guide projection 36a and the front end of the second inclined portion 84b does not abut on the rear end of the second guide projection 36b. In this case, the first and second elastic deformation parts 80a. 80b may elastically deform downward, and the engagement between the first and second engagement parts 82a. 82b and the optical connector adaptor may be accidentally cancelled.

In the case where the axial distance dimension between the front end of the first inclined portion 84a and the rear end of the first guide projection 36a is less than 0.1 mm and the axial distance dimension between the front end of the second inclined portion 84b and the rear end of the second guide projection 36b is less than 0.1 mm, in coupling the optical connector plug 10 with the optical connector adaptor or decoupling the optical connector plug 10 from the optical connector adaptor, just a slight amount of downward elastic deformation of the first and second elastic deformation parts 80a, 80b will let the front end of the first inclined portion 84a abut on the rear end of the first guide projection 36a and the front end of the second inclined portion 84b abut on the rear end of the second guide projection 36b. That is, the downward elastic deformation of the first and second elastic deformation parts 80a, 80b is suppressed, and the first and second engagement parts 82a, 82b cannot smoothly engage with the optical connector adaptor. Furthermore, the engagement between the first and second engagement parts 82a, 82b and the optical connector adaptor cannot be cancelled smoothly. That is, there may be cases where the optical connector plug 10 and the optical connector adaptor fail to be smoothly coupled (optically connected) to each other and where the coupling (optical connection) between the optical connector plug 10 and the optical connector adaptor may fail to be smoothly cancelled.

While the front end of the first inclined portion 84a is positioned immediately behind the first guide projection 36a, the first abutting projection 81a abuts on the upper surface 35 of the top wall 31 of the first plug frame 20a extending immediately behind the first guide projection 36a. While the front end of the second inclined portion 84b is positioned immediately behind the second guide projection 36b, the second abutting projection 81b abuts on the upper surface 35 of the top wall 31 of the second plug frame 20b extending immediately behind the second guide projection 36b. Thus, as compared to the case where the front ends of the first and second engagement latches 75a, 75b are spaced apart upward from the front end of the top wall 31 of the first and second plug frames 20a. 20b, the resilience of the first elastic deformation part 80a becomes great and the resilience of the second elastic deformation part 80b becomes great. Furthermore, the thickness dimension of the first and second horizontal portions 83a, 83b is greater than the thickness dimension of the first and second inclined portions 84a, 84b, and the resilience of the first and second horizontal portions 83a. 83b is greater than the resilience of the first and second inclined portions 84a. 84b. Accordingly, even when the optical connector plug 10 in the state coupled with (optically connected to) the optical connector adaptor is pulled in the direction of cancelling the coupling between the optical connector plug 10 and the optical connector adaptor and thus the axial tensile load acts on the first and second engagement latches 75a. 75b, the downward elastic deformation of the first and second elastic deformation parts 80a, 80b is suppressed. Hence, the coupling between the optical connector plug 10 and the optical connector adaptor will not be accidentally cancelled and the optical connection with the optical connector adaptor is maintained. This prevents any communication loss in which the coupling between the optical connector plug 10 and the optical connector adaptor is accidentally cancelled.

When the first and second optical connector assemblies 11a, 11b are inserted into the optical connector adaptor, the strong resilience of the first and second elastic deformation parts 80a, 80b facilitates upward recovery of the first and second elastic deformation parts 80a. 80b elastically deformed downward. In this manner, ensuring the engagement between the first and second engagement parts 82a, 82b and the optical connector adaptor realizes strong engagement between the first and second engagement parts 82a, 82b and the optical connector adaptor. Thus, the coupling (optical connection) between the optical connector plug 10 and the optical connector adaptor is surely maintained.

The thickness dimension of the first and second inclined portions 84a, 84b is smaller than the thickness dimension of the first and second horizontal portions 83a. 83b, and the resilience of the first and second inclined portions 84a, 84b is smaller than the resilience of the first and second horizontal portions 83a, 83b. Therefore, the first inclined portion 84a elastically deforms easier than the first horizontal portion 83a, and the second inclined portion 84b elastically deforms easier than the second horizontal portion 83b. Thus, when the first and second optical connector assemblies 11a, 11b are inserted into the optical connector adaptor, the first and second engagement parts 82a. 82b smoothly engage with the optical connector adaptor, allowing the optical connector plug 10 to be smoothly coupled to the optical connector adaptor.

Figure 15:
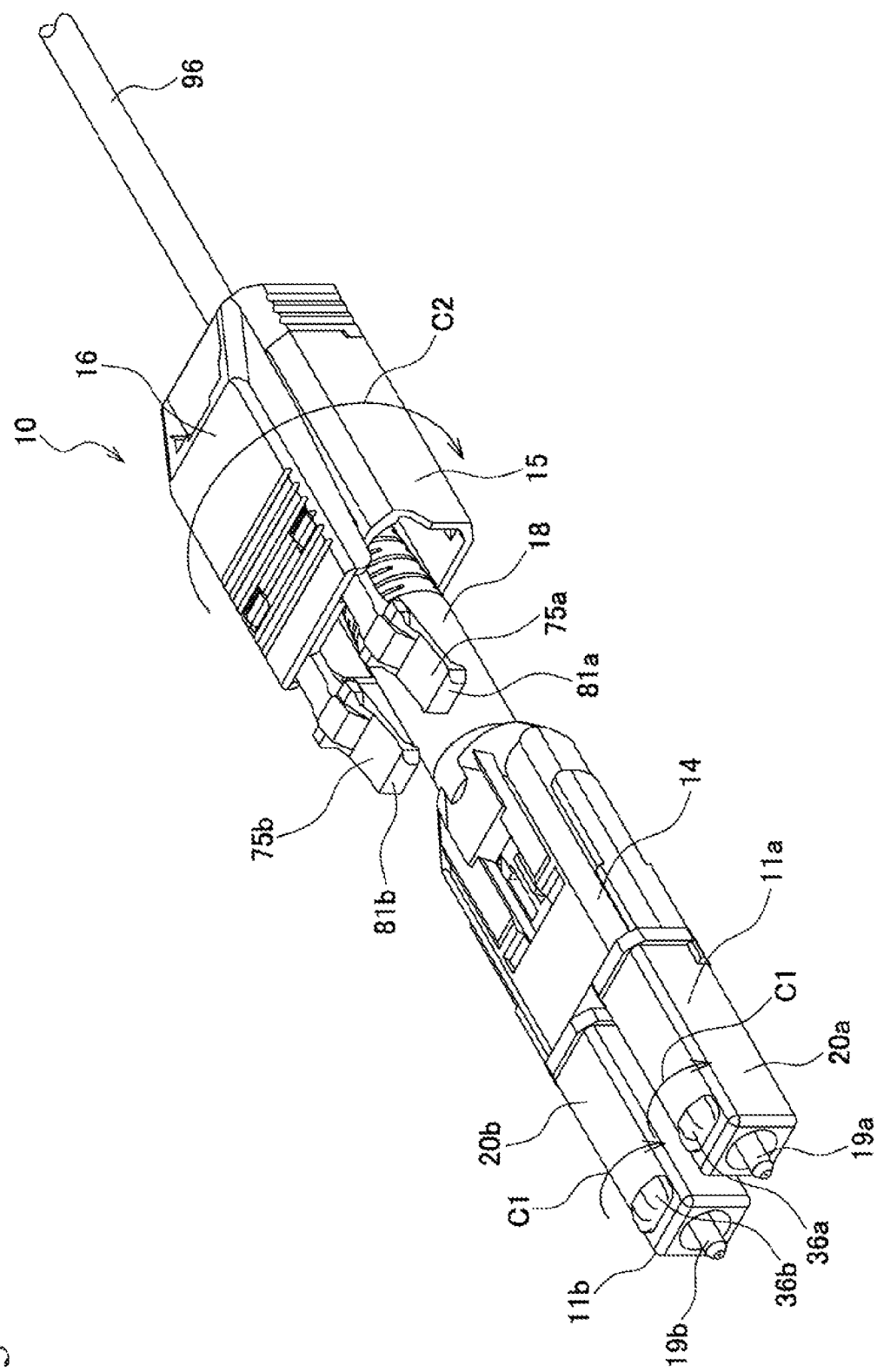
FIG. 15 is a perspective view for explaining the procedure of rotating the first and second optical connector assemblies.
Figure 16:
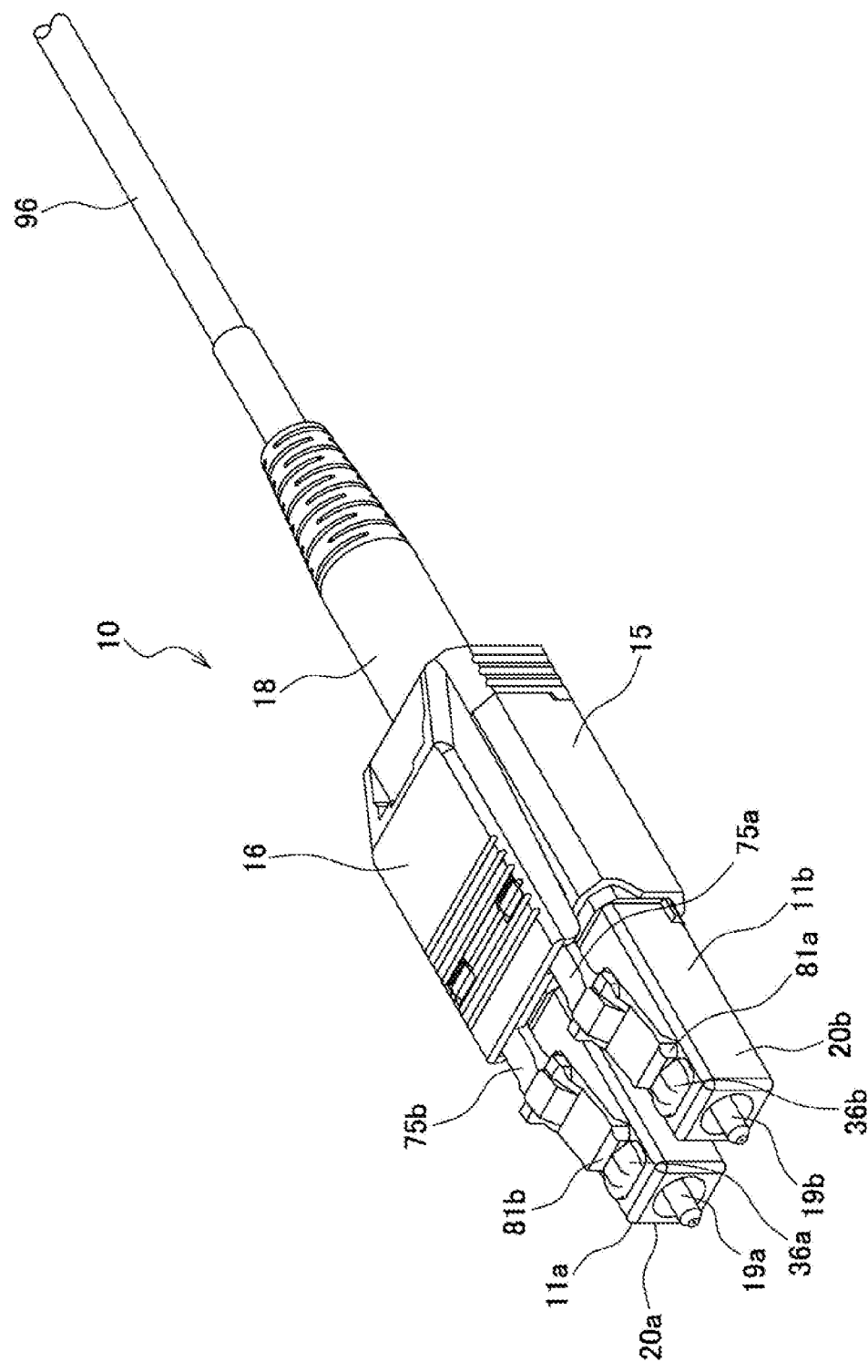
FIG. 16 is a perspective view of the first and second optical connector assemblies having rotated by a half-turn (180 degrees).

FIG. 15 is a perspective view for explaining the procedure of rotating the first and second optical connector assemblies 11a, 11b. FIG. 16 is a perspective view of the first and second optical connector assemblies 11a, 11b having rotated by a half-turn (180 degrees). In the following, a description will be given of the procedure of rotating the first and second optical connector assemblies 11a, 11b of the duplex optical connector plug 10 (a polarity reversing procedure).

In the state where the inner housing 14 and the outer housing 15 are coupled to each other, the boot 18 is pushed out axially frontward. Then, the engagement projections 77 formed at the bottom wall 70 of the outer housing 15 come off from the first and second recesses 67a, 67b formed at the bottom wall 52 of the inner housing 14, to pass over the first and second projections 66a. 66b and enter the first and second guide grooves 65a, 65b. Thus, the fixing between the inner housing 14 and the outer housing 15 is cancelled and, as in FIG. 15, the inner housing 14 is drawn axially frontward from the outer housing 15. Then, for example as indicated by arrow C1 in FIG. 15, the first optical connector assembly 11a (the one optical connector assembly) is rotated clockwise.

In the optical connector plug 10, when the first optical connector assembly 11a out of the first and second optical connector assemblies 11a, 11b rotates clockwise about its axis, the first gear 12a rotates clockwise. The rotation of the first gear 12a causes the intermediate gear 13 to rotate counterclockwise. The intermediate gear 13 transmits the rotational force (rotation) of the first gear 12a to the second gear 12b. In association with the first gear 12a, the second gear 12b rotates about its axis clockwise similarly to the first gear 12a (in the identical direction). Thus, the second optical connector assembly 11b rotates clockwise.

As the gear ratio of the gears 12a, 12b, 13 is 1:1:1, when the first optical connector assembly 11a is rotated clockwise, the second optical connector assembly 11b rotates clockwise by a rotation angle identical to the first optical connector assembly 11a. Note that, when the second optical connector assembly 11b is rotated clockwise, the first optical connector assembly 11a rotates clockwise by a rotation angle identical to the second optical connector assembly 11b.

The rotational force of the first and second gears 12a. 12b rotatably housed in the first and second gear housing parts 60, 61 is transmitted from one of the first and second gears 12a, 12b to the other gears 12a, 12b via the intermediate gear 13 rotatably housed in the intermediate gear housing part 62. Accordingly, use of the gears 12a, 12b. 13 allows the other one of the optical connector assemblies 11a, 11b to rotate in a direction identical to and simultaneously with the one of the optical connector assemblies 11a, 11 b.

As the gear ratio of the gears 12a, 12b. 13 is 1:1:1, when the one of the first and second optical connector assemblies 11a, 11b rotates, the other one of the optical connector assemblies 11a, 11 b rotates by a rotation angle identical to the one of the optical connector assemblies 11a, 11b. Thus, the rotation range from the rotation start point to the rotation end point becomes identical between the first and second optical connector assemblies 11a, 11b. Furthermore, by one of the first and second optical connector assemblies 11a, 11b rotating, the other one of the optical connector assemblies 11a. 11b is rotated to reach the position identical to the one of the first and second optical connector assemblies 11a, 11b.

In the state in FIG. 15, the first and second optical connector assemblies 11a. 11b are rotated clockwise by a half-turn (180 degrees) (rotated from the rotation start point to the rotation end point to make a half-turn). Here, the first rotation stop projection 50a formed at the first gear 12a abuts on the first rotation regulating projection 58a formed on the axial rear side of the first opening 55a of the inner housing 14, and the second rotation stop projection 50b formed at the second gear 12b abuts on the second rotation regulating projection 58b formed on the axial rear side of the second opening 55b of the inner housing 14. This stops the clockwise rotation of the first and second optical connector assemblies 11a, 11b.

After the first and second optical connector assemblies 11a, 11b are rotated clockwise to make a half-turn (180 degrees), as indicated by arrow C2 in FIG. 15, the outer housing 15 (including the slider 16) is rotated clockwise (or counterclockwise) to make a half-turn (180 degrees). Here, the top wall 69 of the outer housing 15 is positioned on the bottom wall 52 side of the inner housing 14 and the bottom wall 70 of the outer housing 15 is positioned on the top wall 51 side of the inner housing 14.

Next, the outer housing 15 is shifted frontward toward the inner housing 14, so as to house (push-in) the inner housing 14 inside the outer housing 15. The engagement projections 77 formed at the bottom wall 70 of the outer housing 15 are inserted into the first and second recesses 67a, 67b formed at the top wall 51 of the inner housing 14, so as to couple the inner housing 14 and the outer housing 15 to each other. In the state in FIG. 1, the first and second optical connector assemblies 11a, 11b are simultaneously rotated clockwise to make a half-turn (180 degrees) to enter the state in FIG. 16. Thus, the polarity of the duplex optical connector plug 10 is reversed.

After the optical connector plug 10 in FIG. 16 has its polarity reversed, following the above-described procedure, the inner housing 14 is drawn axially frontward from the outer housing 15 and the second optical connector assembly 11b (the one optical connector assembly) is rotated counterclockwise and the first optical connector assembly 11a is rotated counterclockwise. Thereafter, the outer housing 15 (including the slider 16) is rotated counterclockwise (or clockwise) to make a half-turn (180 degrees).

Next, in the state where top wall 51 of the inner housing 14 opposes to the top wall 69 of the outer housing 15 and the bottom wall 52 of the inner housing 14 opposes to the bottom wall 70 of the outer housing 15, the outer housing 15 is shifted frontward toward the inner housing 14, so as to house (push-in) the inner housing 14 inside the outer housing 15. The engagement projections 77 formed at the bottom wall 70 of the outer housing 15 are inserted into the first and second recesses 67*a*. 67*b* formed at the bottom wall 52 of the inner housing 14, so as to couple the inner housing 14 and the outer housing 15 to each other. In the state in FIG. 16, the first and second optical connector assemblies 11*a*, 11*b* are simultaneously rotated counterclockwise to make a half-turn (180 degrees) to enter the state in FIG. 1. Thus, the polarity of the duplex optical connector plug 10 is reversed.

According to the polarity reversing procedure, when the one of the first and second optical connector assemblies 11*a*, 11*b* is rotated about its axis from the rotation start point to the rotation end point to make a half-turn (180 degrees), in association with the rotation, the other one of the optical connector assemblies 11*a*, 11*b* rotates about its axis from the rotation start point to the rotation end point to make a half-turn (180 degrees) in the direction identical to the one of the first and second optical connector assemblies 11*a*, 11*b*. Thus, the polarity of the duplex optical connector plug 10 is reversed from the state in FIG. 1 to the state in FIG. 16 and vice versa.

In the duplex optical connector plug 10 having its polarity reversed from the state in FIG. 1 to the state in FIG. 16 or from the state in FIG. 16 to the state in FIG. 1, the front end of the first inclined portion 84*a* is positioned immediately behind the rear end of the first guide projection 36*a* of the first plug frame 20*a*, while the first abutting projection 81*a* abuts on the upper surface 35 of the top wall 31 of the first plug frame 20*a* extending immediately behind the rear end of the first guide projection 36*a*. Furthermore, the front end of the second inclined portion 84*b* is positioned immediately behind the rear end of the second guide projection 36*b* of the second plug frame 20*b*, while the second abutting projection 81*b* abuts on the upper surface 35 of the top wall 31 of the second plug frame 20*b* extending immediately behind the rear end of the second guide projection 36*b*.

In the duplex optical connector plug 10 having its polarity reversed from the state in FIG. 1 to the state in FIG. 16 or from the state from FIG. 16 to the state in FIG. 1, the first abutting projection 81*a* similarly abuts on the upper surface 35 of the top wall 31 of the first plug frame 20*a* extending immediately behind the rear end of the first guide projection 36*a*. This contributes to maintaining a high vertical resilience of the first elastic deformation part 80*a* (the first horizontal portion 83*a* and the first inclined portion 84*a*). Furthermore, the second abutting projection 81*b* abuts on the upper surface 35 of the top wall 31 of the second plug frame 20*b* extending immediately behind the rear end of the second guide projection 36*b*. This contributes to maintaining high vertical direction resilience of the second elastic deformation part 80*b* (the second horizontal portion 83*b* and the second inclined portion 84*b*).

REFERENCE SIGNS LIST

10 duplex optical connector plug
11*a* first optical connector assembly
11*b* second optical connector assembly
12*a* first gear
12*b* second gear
13 intermediate gear
14 inner housing
15 outer housing
16 slider
17 crimping ring
18 boot
19*a* first ferrule
19*b* second ferrule
20*a* first plug frame
20*b* second plug frame
21*a* first stop ring
21*b* second stop ring
22*a* first spring
22*b* second spring
23*a* first capillary
23*b* second capillary
24*a* first sleeve
24*b* second sleeve
25*a* first optical fiber
25*b* second optical fiber
26 tip surface
27 chamfered part
28 pipe
29*a* first buffered fiber cover
29*b* second buffered fiber cover
30*a* first flange
30*b* second flange
31 top wall
32 bottom wall
33 side wall
34 side wall
35 upper surface
36*a* first guide projection
36*b* second guide projection
37*a* first flange
37*b* second flange
38*a* first engageable recess
38*b* second engageable recess
39 ferrule housing space
40 front end exposing opening
41 rear end insert opening
42 abutting part
43 guide recess
44 front end
45 intermediate part
46 rear end
47 buffered fiber exposing opening
48 buffered fiber insert opening
49 guide projection
50*a* first rotation stop projection (rotation angle restricting means)
50*b* second rotation stop projection (rotation angle restricting means)
51 top wall
52 bottom wall
53 side wall
54 side wall
55*a* first opening
55*b* second opening
56 tube part
57*a* first engageable projection
57*b* second engageable projection
58*a* first rotation regulating projection (rotation angle restricting means)
58*b* second rotation regulating projection (rotation angle restricting means)
59 partition wall
60 first gear housing part
61 second gear housing part
62 intermediate gear housing part
63 fitting hole
64 fitting hook
65*a* first guide groove 65b second guide groove
66a first projection
66b second projection
67a first recess
67b second recess
68 guide projection
69 top wall
70 bottom wall
71 side wall
72 side wall
73 front end opening
74 rear end opening
75a first engagement latch
75b second engagement latch
76 engageable-insert key
77 engagement projection
78 guide recess
79a first coupling part
79b second coupling part
80a first elastic deformation part
80b second elastic deformation part
81a first abutting projection
81b second abutting projection
82a first engagement part
82b second engagement part
83a first horizontal portion
83b second horizontal portion
84a first inclined portion
84b second inclined portion
85 inclined surface
86a first inclined projection
86b second inclined projection
87 frame
88 sliding top wall
89a first outer guide wall
89b second outer guide wall
90a first inner guide wall
90b second inner guide wall
91a first entry path
91b second entry path
92a first inclined recess
92b second inclined recess
93a first through hole
93b second through hole
94 inclined surface
95 key engageable-insert part
96 optical fiber cord

What is claimed is:

1. A duplex optical connector plug comprising:
a first optical connector assembly including
a first plug frame configured to house a first ferrule that axially extends and retains a first optical fiber, the first plug frame including a first top wall,
a first stop ring configured to be inserted into the first plug frame, and
a first spring disposed between the first ferrule and the first stop ring to bias the first ferrule axially frontward;
a second optical connector assembly provided in parallel with the first optical connector assembly; the second optical connector assembly including
a second plug frame configured to house a second ferrule that axially extends and retains a second optical fiber, the second plug frame including a second top wall,
a second stop ring configured to be inserted into the second plug frame, and
a second spring disposed between the second ferrule and the second stop ring to bias the second ferrule axially frontward;
an inner housing configured to house a rear end of the first stop ring and a rear end of the second stop ring; and
an outer housing configured to house the inner housing;
the outer housing including
a front end opening that opens at a front end of the outer housing,
a third top wall, and
a first engagement latch being elastically deformable and axially extending on a first lateral side of the third top wall and extending axially frontward from the front end opening, the first engagement latch including
a first abutting projection formed at a front end of the first engagement latch and configured to abut on a front end positioned on an axially front side of the first top wall, and
a first engagement part formed on an axial rear side of the first abutting projection and configured to engage with an optical connector adaptor when the first optical connector assembly is inserted into the optical connector adaptor, and
a second engagement latch being elastically deformable and axially extending on a second lateral side of the third top wall and extending axially frontward from the front end opening, the second engagement latch including
a second abutting projection formed at a front end of the second engagement latch and configured to abut on a front end positioned on an axially front side of the second top wall, and
a second engagement part formed on an axial rear side of the second abutting projection and configured to engage with the optical connector adaptor when the second optical connector assembly is inserted into the optical connector adaptor, wherein
the first engagement latch includes
a first coupling part coupled to the third top wall, and
a first elastic deformation part continuous to the first coupling part and extending axially frontward from the first coupling part and extending axially frontward from the front end opening of the outer housing, the first elastic deformation part including
a first horizontal portion extending horizontally and axially frontward from the first coupling part, and
a first inclined portion continuous to the first horizontal portion and extending, while being inclined downward, axially frontward from the first horizontal portion toward the first top wall, and
the second engagement latch includes
a second coupling part coupled to the third top wall, and
a second elastic deformation part continuous to the second coupling part and extending axially frontward from the second coupling part and extending axially frontward from the front end opening of the outer housing, the second elastic deformation part including
a second horizontal portion extending horizontally and axially frontward from the second coupling part, and
a second inclined portion continuous to the second horizontal portion and extending, while being inclined downward, axially frontward from the second horizontal portion toward the second top wall.

2. The duplex optical connector plug according to claim 1, wherein
the first coupling part is coupled to the third top wall and the first abutting projection abuts on the first top wall so that vertical resilience of the first elastic deformation part enhances, and
the second coupling part is coupled to the third top wall and the second abutting projection abuts on the second top wall so that vertical resilience of the second elastic deformation part enhances.

3. The duplex optical connector plug according to claim 1, wherein
the first and second inclined portions are smaller than the first and second horizontal portions in thickness dimension, and
the first and second inclined portions are smaller than the first and second horizontal portions in resilience.

4. The duplex optical connector plug according to claim 1, wherein
the first plug frame includes, at a front end of the first top wall, a first guide projection projecting upward from the first top wall,
the second plug frame includes, at a front end of the second top wall, a second guide projection projecting upward from the second top wall,
a front end of the first inclined portion is positioned immediately behind the first guide projection while the first abutting projection abuts on the first top wall extending immediately behind the first guide projection, and
a front end of the second inclined portion is positioned immediately behind the second guide projection while the second abutting projection abuts on the second top wall extending immediately behind the second guide projection.

5. The duplex optical connector plug according to claim 4, wherein in a coupled state where the first and second optical connector assemblies are inserted into and coupled to the optical connector adaptor, when the optical connector plug is pulled in a direction of cancelling the coupled state and an axial tensile load acts on the first and second engagement latches and the first and second engagement latches are axially stretched, a front end of the first inclined portion abuts on a rear end of the first guide projection while a front end of the second inclined portion abuts on a rear end of the second guide projection so as to suppress a downward elastic deformation of the first and second elastic deformation parts and maintain an engagement of the first and second engagement latches with the optical connector adaptor.

6. The duplex optical connector plug according to claim 4, wherein
an axial distance dimension between the front end of the first engagement latch and the rear end of the first guide projection falls within a range of 0.1 mm to 0.6 mm, and
an axial distance dimension between the front end of the second engagement latch and the rear end of the second guide projection falls within a range of 0.1 mm to 0.6 mm.

7. The duplex optical connector plug according to claim 1, further comprising
a slider axially slidably coupled to the outer housing, wherein the first and second engagement latches include push-down mechanisms configured to maintain the engagement of the first and second engagement latches with the optical connector adaptor before the slider is slid axially rearward relative to the outer housing, the push-down mechanisms being configured to cancel the engagement of the first and second engagement latches with the optical connector adaptor when the slider is slid axially rearward relative to the outer housing by allowing the slider to push downward the first and second engagement latches.

8. The duplex optical connector plug according to claim 7, wherein
the push-down mechanisms include:
a first inclined projection formed at the first horizontal portion and inclined upward axially rearward;
a second inclined projection formed at the second horizontal portion and inclined upward axially rearward;
a first inclined recess positioned on a first lateral side of the slider and configured to slidably abut on the first inclined projection, the first inclined recess being inclined upward axially rearward and recessed; and
a second inclined recess positioned on a second lateral side of the slider and configured to slidably abut on the second inclined projection, the second inclined recess being inclined upward axially rearward and recessed.

9. The duplex optical connector plug according to claim 1, further comprising an optical fiber cord mounted on an axial rear side of the duplex optical connector plug.

10. The duplex optical connector plug according to claim 2, wherein the first and second inclined portions are smaller than the first and second horizontal portions in thickness dimension, and
the first and second inclined portions are smaller than the first and second horizontal portions in resilience.

11. The duplex optical connector plug according to claim 2, wherein
the first plug frame includes, at a front end of the first top wall, a first guide projection projecting upward from the first top wall,
the second plug frame includes, at a front end of the second top wall, a second guide projection projecting upward from the second top wall,
a front end of the first inclined portion is positioned immediately behind the first guide projection while the first abutting projection abuts on the first top wall extending immediately behind the first guide projection, and
a front end of the second inclined portion is positioned immediately behind the second guide projection while the second abutting projection abuts on the second top wall extending immediately behind the second guide projection.

12. The duplex optical connector plug according to claim 3, wherein
the first plug frame includes, at a front end of the first top wall, a first guide projection projecting upward from the first top wall,
the second plug frame includes, at a front end of the second top wall, a second guide projection projecting upward from the second top wall,
a front end of the first inclined portion is positioned immediately behind the first guide projection while the first abutting projection abuts on the first top wall extending immediately behind the first guide projection, and a front end of the second inclined portion is positioned immediately behind the second guide projection while the second abutting projection abuts on the second top wall extending immediately behind the second guide projection.

13. The duplex optical connector plug according to claim 5, wherein
an axial distance dimension between the front end of the first engagement latch and the rear end of the first guide projection falls within a range of 0.1 mm to 0.6 mm, and
an axial distance dimension between the front end of the second engagement latch and the rear end of the second guide projection falls within a range of 0.1 mm to 0.6 mm.

14. The duplex optical connector plug according to claim 2, further comprising
a slider axially slidably coupled to the outer housing, wherein
the first and second engagement latches include push-down mechanisms configured to maintain the engagement of the first and second engagement latches with the optical connector adaptor before the slider is slid axially rearward relative to the outer housing, the push-down mechanisms being configured to cancel the engagement of the first and second engagement latches with the optical connector adaptor when the slider is slid axially rearward relative to the outer housing by allowing the slider to push downward the first and second engagement latches.

15. The duplex optical connector plug according to claim 3, further comprising
a slider axially slidably coupled to the outer housing, wherein
the first and second engagement latches include push-down mechanisms configured to maintain the engagement of the first and second engagement latches with the optical connector adaptor before the slider is slid axially rearward relative to the outer housing, the push-down mechanisms being configured to cancel the engagement of the first and second engagement latches with the optical connector adaptor when the slider is slid axially rearward relative to the outer housing by allowing the slider to push downward the first and second engagement latches.

16. The duplex optical connector plug according to claim 4, further comprising
a slider axially slidably coupled to the outer housing, wherein
the first and second engagement latches include push-down mechanisms configured to maintain the engagement of the first and second engagement latches with the optical connector adaptor before the slider is slid axially rearward relative to the outer housing, the push-down mechanisms being configured to cancel the engagement of the first and second engagement latches with the optical connector adaptor when the slider is slid axially rearward relative to the outer housing by allowing the slider to push downward the first and second engagement latches.

17. The duplex optical connector plug according to claim 5, further comprising
a slider axially slidably coupled to the outer housing, wherein
the first and second engagement latches include push-down mechanisms configured to maintain the engagement of the first and second engagement latches with the optical connector adaptor before the slider is slid axially rearward relative to the outer housing, the push-down mechanisms being configured to cancel the engagement of the first and second engagement latches with the optical connector adaptor when the slider is slid axially rearward relative to the outer housing by allowing the slider to push downward the first and second engagement latches.

18. The duplex optical connector plug according to claim 6, further comprising
a slider axially slidably coupled to the outer housing, wherein
the first and second engagement latches include push-down mechanisms configured to maintain the engagement of the first and second engagement latches with the optical connector adaptor before the slider is slid axially rearward relative to the outer housing, the push-down mechanisms being configured to cancel the engagement of the first and second engagement latches with the optical connector adaptor when the slider is slid axially rearward relative to the outer housing by allowing the slider to push downward the first and second engagement latches.

* * * * *